United States Patent
Usui

(10) Patent No.: US 11,036,315 B2
(45) Date of Patent: Jun. 15, 2021

(54) PEN-TYPE INPUT DEVICE, INPUT CONTROL METHOD, COMPUTER-READABLE RECORDING MEDIUM STORING PROGRAM, AND INFORMATION PROCESSING SYSTEM

(71) Applicant: SHARP KABUSHIKI KAISHA, Sakai (JP)

(72) Inventor: Takashi Usui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/793,628

(22) Filed: Feb. 18, 2020

(65) Prior Publication Data

US 2020/0285328 A1 Sep. 10, 2020

(30) Foreign Application Priority Data

Mar. 7, 2019 (JP) .............................. JP2019-041868

(51) Int. Cl.
*G06F 3/0354* (2013.01)
*G06F 3/0482* (2013.01)
*G06F 3/038* (2013.01)

(52) U.S. Cl.
CPC .......... *G06F 3/03545* (2013.01); *G06F 3/038* (2013.01); *G06F 3/0482* (2013.01)

(58) Field of Classification Search
CPC ..... G06F 3/03545; G06F 3/038; G06F 3/0482
USPC ......................................................... 345/179
See application file for complete search history.

(56) References Cited

U.S. PATENT DOCUMENTS

| | | | |
|---|---|---|---|
| 6,956,564 B1* | 10/2005 | Williams | G09G 5/00 |
| 10,496,193 B1* | 12/2019 | Alfano | G06F 3/03547 |
| 2015/0363011 A1* | 12/2015 | Kelso | G06F 3/03545 |
| | | | 345/179 |
| 2019/0101754 A1* | 4/2019 | Bharti | G06F 3/03545 |
| 2019/0113986 A1* | 4/2019 | Bikumala | G06F 3/017 |

FOREIGN PATENT DOCUMENTS

| | | |
|---|---|---|
| JP | 2009-217604 A | 9/2009 |
| JP | 2010-238046 A | 10/2010 |
| JP | 2015-146090 A | 8/2015 |
| JP | 5989903 B2 | 9/2016 |

\* cited by examiner

*Primary Examiner* — Mark Edwards
(74) *Attorney, Agent, or Firm* — ScienBiziP, P.C.

(57) ABSTRACT

A pen-type input device having a plurality of functions, including: a pillar-shaped pen body; a contact sensor; a detection position determiner that determines a holding position of the pen body based on a detection result of the contact sensor; and a function specifier that specifies a function of the pen-type input device based on a determination result of the detection position determiner. The contact sensor detects a position where a finger of a holding hand that holds the pen body contacts, and a position where a portion between a base of a thumb and a base of a forefinger of the holding hand contacts.

12 Claims, 21 Drawing Sheets

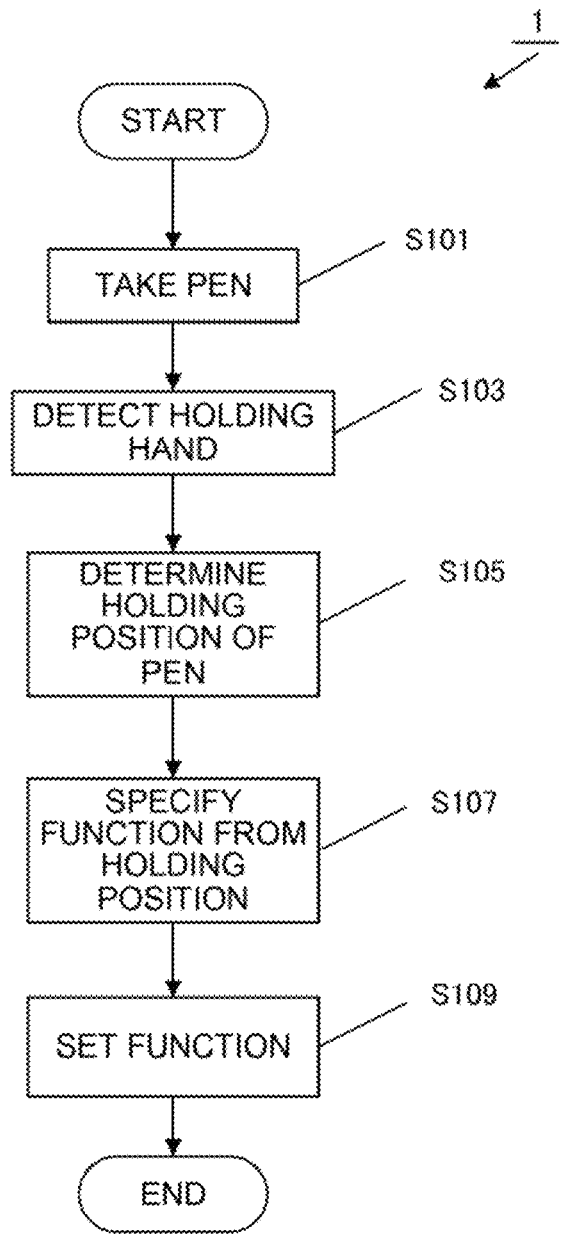

FIG. 12

EXAMPLE 1

| SETTING | LINE THICKNESS SETTING | DISPLAY |
|---|---|---|
| A | VERY THIN LINE | VERY THIN |
| B | NORMAL THICKNESS LINE | NORMAL OR STANDARD |
| C | THICK LINE | THICK |
| D | VERY THICK LINE | VERY THICK |

FIG. 13

EXAMPLE 2

| SETTING | ERASER SETTING (1) | DISPLAY |
|---|---|---|
| A | NORMAL PEN INPUT | PEN INPUT |
| B | THIN ERASURE WIDTH | ERASER (THIN) |
| C | NORMAL ERASURE WIDTH | ERASER (NORMAL) |
| D | THICK ERASURE WIDTH | ERASER (THICK) |

FIG. 14

EXAMPLE 3

| SETTING | ERASER SETTING (2) | DISPLAY |
|---|---|---|
| A | NORMAL PEN INPUT | PEN INPUT |
| B | ERASE CONTACT PATH | ERASER (SELECTED ERASURE) |
| C | ERASE PASSAGE PATH | ERASER (NORMAL ERASURE) |
| D | THINNING ACCORDING TO PASSAGE FREQUENCY | ERASER (BLURRED ERASURE) |

FIG. 15

EXAMPLE 4

| SETTING | PEN TYPE SETTING | DISPLAY |
|---|---|---|
| A | NORMAL PEN INPUT | PEN INPUT |
| B | BRUSH | BRUSH |
| C | FILL WITH MARKER | MARKER (FILL) |
| D | HIGHLIGHT WITH MARKER | MARKER (HIGHLIGHT) |

FIG. 16

EXAMPLE 5

| SETTING | LINE TYPE SETTING | DISPLAY |
|---|---|---|
| A | NORMAL LINE | NORMAL LINE |
| B | DOUBLE LINE | DOUBLE LINE |
| C | WAVY LINE | WAVY LINE |
| D | DOTTED LINE | DOTTED LINE |

FIG. 17

EXAMPLE 6

| SETTING | GRAPHIC INPUT SETTING | DISPLAY |
|---|---|---|
| A | NORMAL INPUT | PEN |
| B | STRAIGHT LINE DRAWING | STRAIGHT LINE |
| C | SQUARE DRAWING | SQUARE |
| D | CIRCULAR DRAWING | CIRCLE |

FIG. 18

EXAMPLE 7

| SETTING | EDIT SETTING | DISPLAY |
|---|---|---|
| A | NORMAL INPUT | PEN |
| B | PAGE FEEDING, SCROLLING | SWIPE |
| C | SELECT, MOVE, PLACE | MOVE |
| D | CREATE TEXT BOX | TEXT BOX |

FIG. 19

EXAMPLE 8

| SETTING | PEN INPUT MODE SETTING | DISPLAY |
|---|---|---|
| A | NORMAL INPUT MODE | PEN |
| B | ERASER MODE | ERASER |
| C | MENU DISPLAY MODE | MENU |
| D | SELECTION TOOL | SELECT TOOL |

FIG. 22A
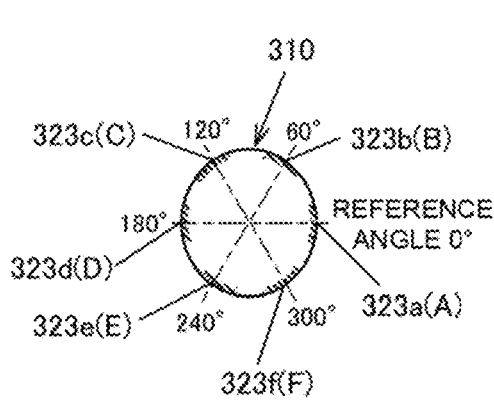
FIG. 22B
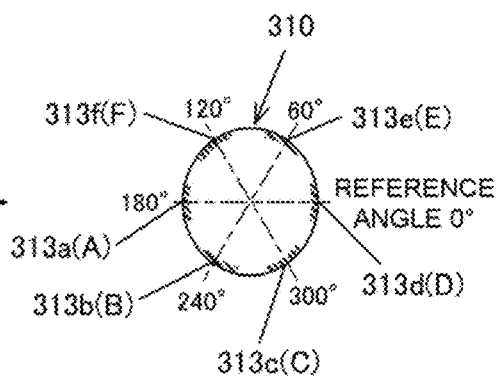
FUNCTION DISPLAY AND SENSOR DISPOSED ON MUTUALLY OPPOSITE SIDES
FIG. 23
EXAMPLE 1
| SETTING | SETTING ANGLE | PEN INPUT COLOR SETTING | DISPLAY |
|---|---|---|---|
| A | 0(=360)° | RED | RED |
| B | 60° | YELLOW | YELLOW |
| C | 120° | GREEN | GREEN |
| D | 180° | CYAN | CYAN |
| E | 240° | BLUE | BLUE |
| F | 300° | MAGENTA | MAGENTA |
FIG. 24
EXAMPLE 2
| SETTING | SETTING ANGLE | LINE WIDTH SETTING | DISPLAY |
|---|---|---|---|
| A | 0(=360)° | NORMAL | NORMAL |
| B | 90° | THICK | THICK |
| C | 180° | NORMAL | NORMAL |
| D | 270° | THIN | THIN |

FIG. 32

EXAMPLE 1

| SETTING | LINE THICKNESS SETTING | CONTACT SENSOR |
|---|---|---|
| A | VERY THIN LINE | 520a |
| B | THIN LINE | 520b |
| C | NORMAL THICKNESS LINE | 520c |
| D | THICK LINE | 520d |
| E | VERY THICK LINE | 520e |

FIG. 33

EXAMPLE 2

| SETTING | ERASER SETTING (1) | DISPLAY |
|---|---|---|
| A | NORMAL PEN INPUT | 520a |
| B | THIN ERASURE WIDTH | 520b |
| C | NORMAL ERASURE WIDTH | 520c |
| D | THICK ERASURE WIDTH | 520d |
| E | VERY THICK ERASURE WIDTH | 520e |

FIG. 34

EXAMPLE 3

| SETTING | ERASER SETTING (2) | CONTACT SENSOR |
|---|---|---|
| A | NORMAL PEN INPUT | 520a |
| B | ERASE CONTACT PATH | 520b |
| C | ERASE PASSAGE PATH | 520c |
| D | BLACK FILL | 520d |
| E | THINNING ACCORDING TO PASSAGE FREQUENCY, BLURRED ERASURE | 520e |

FIG. 35

EXAMPLE 4

| SETTING | PEN TYPE SETTING | CONTACT SENSOR |
|---|---|---|
| A | HARD BRUSH | 520a |
| B | PEN | 520b |
| C | HIGHLIGHT WITH MARKER | 520c |
| D | BRUSH | 520d |

FIG. 36

EXAMPLE 5

| SETTING | LINE TYPE SETTING | CONTACT SENSOR |
|---|---|---|
| A | NORMAL LINE | 520a |
| B | BROKEN LINE | 520b |
| C | DOUBLE LINE | 520c |
| D | WAVY LINE | 520d |

FIG. 37

EXAMPLE 6

| SETTING | GRAPHIC INPUT SETTING | CONTACT SENSOR |
|---|---|---|
| A | NORMAL INPUT | 520a |
| B | STRAIGHT LINE DRAWING | 520b |
| C | TRIANGULAR DRAWING | 520c |
| D | SQUARE DRAWING | 520d |
| E | CIRCULAR DRAWING | 520e |

FIG. 38

EXAMPLE 7

| SETTING | EDIT SETTING | CONTACT SENSOR |
|---|---|---|
| A | NORMAL INPUT | 520a |
| B | SWIPE (PAGE FEEDING, SCROLLING) | 520b |
| C | SAVE | 520c |
| D | CREATE NEW | 520d |

FIG. 39

EXAMPLE 8

| SETTING | PEN INPUT MODE SETTING | CONTACT SENSOR |
|---|---|---|
| A | NORMAL INPUT MODE | 520a |
| B | ERASER MODE | 520b |
| C | SELECT TOOL | 520c |
| D | MENU DISPLAY MODE | 520d |

PEN-TYPE INPUT DEVICE, INPUT CONTROL METHOD, COMPUTER-READABLE RECORDING MEDIUM STORING PROGRAM, AND INFORMATION PROCESSING SYSTEM

This Nonprovisional application claims priority under 35 U.S.C. § 119(a) on Patent Application No. 2019-041868 filed in Japan on 7 Mar. 2019, the entire contents of which are hereby incorporated by reference.

BACKGROUND OF THE INVENTION

Field of the Invention

The present invention relates to a pen-type input device, in particular, relates to a pen-type input device having a plurality of functions for use with an information processing device capable of receiving an input operation by a touch operation on a display screen, an input control method, a computer-readable recording medium, and an information processing system.

Description of the Background Art

Conventionally, a pen-type input device is known in which a contact detection device is provided on a side surface portion.

A contact detection device is used, for example, for detecting a holding state to prevent an erroneous operation, or for setting an information input area for performing operations such as a click.

Furthermore, a technique is known in which a holding hand of a pen-type input device is determined by a contact detection device.

As a conventional technique, for example, disclosed is the determination of a holding hand from the length and orientation of handwritten strokes on a display of an electronic device (see Japanese Patent No. 5,989,903), and the determination of a holding hand from the size of a user-pressed area on an input device (see Japanese Unexamined Patent Application Publication No. 2015-146090).

Furthermore, as a pen-type input device, disclosed is a device that detects a holding position by a sensor provided on a side surface portion, which prevents an erroneous operation at the time operating the pen-type input device (see Japanese Unexamined Patent Application Publication No. 2009-217604), and a device in which a contact detection device is arranged over the entire periphery of a grip portion of the pen-type input device to detect the position of a holding finger, such that an information input area is set based on the contact position of the finger (see Japanese Unexamined Patent Application Publication No. 2010-238046).

SUMMARY OF THE INVENTION

Problems to be Solved by the Invention

However, neither of the techniques in Japanese Patent Publication No. 5,989,903 and Japanese Unexamined Patent Application Publication No. 2015-146090 can be said to be highly reliable as techniques for accurately determining a holding hand.

Furthermore, the techniques in Japanese Unexamined Patent Application Publication No. 2009-217604 and Japanese Unexamined Patent Application Publication No. 2010-238046 detect the holding position or detect the position of a finger which is holding the pen-type input device. However, the orientation of the pen-type input device cannot be detected, which leads to a problem that the operation of the pen-type input device becomes complicated, and that the operability is poor.

The present invention has been made in view of the conventional problems described above. An object of the present invention is to provide a pen-type input device and the like that accurately determines the state of a holding hand of the input device and detects the orientation of the pen-type input device at the time the pen-type input device is used, and enables an improvement in operability to be achieved.

Means for Solving the Problem

The present invention is a pen-type input device having a plurality of functions for use with an information processing device capable of receiving an input operation by a touch operation on a display screen. The pen-type input device includes a pen body having a pillar shape, a contact sensor provided on a portion of a surface of the pen body, a detection position determiner that determines a holding position of the pen body based on a detection result of the contact sensor, and a function specifier that specifies a function of the pen-type input device based on a determination result of the detection position determiner, wherein the contact sensor detects, on a surface of the pen body, a position where a finger of a holding hand that holds the pen body contacts, and a position where a portion between a base of a thumb and a base of a forefinger of the holding hand contacts.

Furthermore, the present invention is an input control method of a pen-type input device having a plurality of functions for use with an information processing device capable of receiving an input operation by a touch operation on a display screen. The method includes detecting that a pen body of the pen-type input device has been held, the pen body having a pillar shape, determining a holding position of the pen body based on a result of the detecting, and specifying a function of the pen-type input device based on a result of the determining, wherein, in the detecting, a position where a finger of a holding hand that holds the pen body contacts, and a position where a portion between a base of a thumb and a base of a forefinger of the holding hand contacts are detected.

Moreover, the present invention is non-transitory computer-readable recording medium storing a program of a pen-type input device having a plurality of functions for use with an information processing device capable of receiving an input operation by a touch operation on a display screen. The program causes a computer to realize a function for detecting that a pillar-shaped pen body of the pen-type input device has been held, a function for determining a holding position of the pen body based on a result of the detection, a function for specifying a function of the pen-type input device based on a result of the determination; and a function for detecting a contact position at which a finger of a holding hand is holding the pen body, and a contact position of a portion between a base of a thumb and a base of a forefinger of the holding hand.

In addition, the present invention is an information processing system that includes an information processing device capable of receiving an input operation by a touch operation on a display screen, and a pen-type input device that performs an input operation with respect to the information processing device. The pen-type input device includes a pen body having a pillar shape, a contact sensor provided on a portion of a surface of the pen body, a detection position determiner that determines a holding position of the pen body based on a detection result of the contact sensor, and a function specifier that specifies a function of the pen-type input device based on a determination result of the detection position determiner, wherein the contact sensor detects, on a surface of the pen body, a position where a finger of a holding hand that holds the pen body contacts, and a position where a portion between a base of a thumb and a base of a forefinger of the holding hand contacts.

Effects of the Invention

According to the present invention, a contact sensor provided on a portion of the surface of the pillar-shaped pen body detects a holding position of the pen body, and detects a position where a finger of a holding hand that holds the pen body contacts, and a position where a portion between a base of a thumb and a base of a forefinger of the holding hand contacts. Thus, the holding position of the pen body can be accurately determined. Consequently, by specifying a function of the pen-type input device based on the determination result, a pen-type input device and the like can be provided in which an improvement in operability can be achieved.

BRIEF DESCRIPTION OF THE DRAWINGS

FIG. 7 is a flowchart showing a processing procedure for performing a function setting in the pen-type input device.

FIG. 12 is a table showing the settings in Example 1 for setting a line thickness in the pen-type input device according to the second embodiment.

FIG. 13 is a table showing the settings in Example 2 for performing an eraser setting in the pen-type input device according to the second embodiment.

FIG. 14 is a table showing the settings in Example 3 for performing an eraser setting in the pen-type input device according to the second embodiment.

FIG. 15 is a table showing the settings in Example 4 for performing a pen type setting in the pen-type input device according to the second embodiment.

FIG. 16 is a table showing the settings in Example 5 for performing a line type setting in the pen-type input device according to the second embodiment.

FIG. 17 is a table showing the settings in Example 6 for performing a graphic input setting in the pen-type input device according to the second embodiment.

FIG. 18 is a table showing the settings in Example 7 for performing an edit setting in the pen-type input device according to the second embodiment.

FIG. 19 is a table showing the settings in Example 8 for performing a pen input mode setting in the pen-type input device according to the second embodiment.

FIG. 22A is an explanatory diagram showing the positional relationship between a plurality of displays on the pen body of the pen-type input device according to the third embodiment, and FIG. 22B is an explanatory diagram showing the positional relationship between the plurality of displays on the pen body, which correspond to the plurality of detectors.

FIG. 23 is a table showing the settings in Example 1 for setting a pen input color in the pen-type input device according to the third embodiment.

FIG. 24 is a table showing the settings in Example 2 for setting a line width of a pen input in the pen-type input device according to the third embodiment.

FIG. 32 is a table showing the settings in Example 1 for setting a line thickness in the pen-type input device according to the fifth embodiment.

FIG. 33 is a table showing the settings in Example 2 for performing an eraser setting in the pen-type input device according to the fifth embodiment.

FIG. 34 is a table showing the settings in Example 3 for performing an eraser setting in the pen-type input device according to the fifth embodiment.

FIG. 35 is a table showing the settings in Example 4 for performing a pen type setting in the pen-type input device according to the fifth embodiment.

FIG. 36 is a table showing the settings in Example 5 for performing a line type setting in the pen-type input device according to the fifth embodiment.

FIG. 37 is a table showing the settings in Example 6 for performing a graphic input setting in the pen-type input device according to the fifth embodiment.

FIG. 38 is a table showing the settings in Example 7 for performing an edit setting in the pen-type input device according to the fifth embodiment.

FIG. 39 is a table showing the settings in Example 8 for performing a pen input mode setting in the pen-type input device according to the fifth embodiment.

DESCRIPTION OF THE PREFERRED EMBODIMENTS

First Embodiment

Hereinafter, a first embodiment of the present invention will be described with reference to the drawings.

Figure 1:
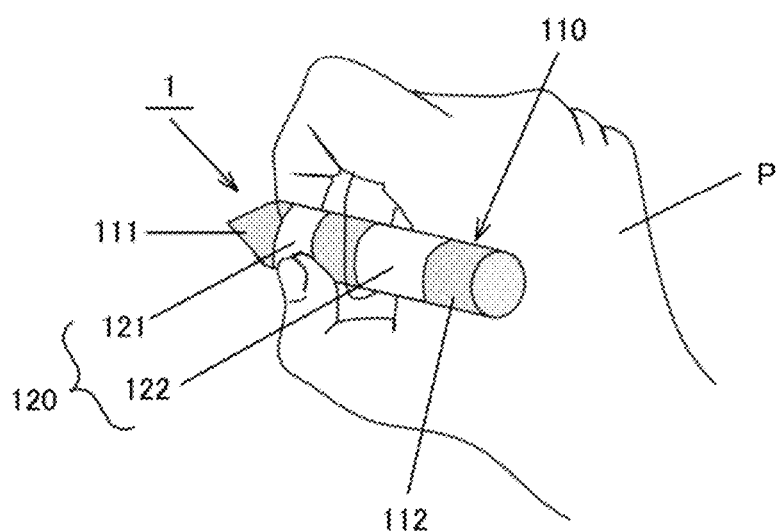
FIG. 1 is an explanatory diagram showing a state in which a pen-type input device according to a first embodiment is being used.
Figure 2:
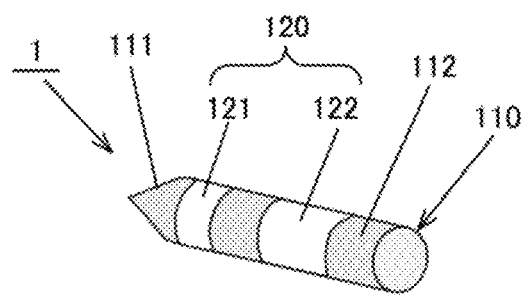
FIG. 2 is an explanatory diagram showing an overall configuration of the pen-type input device.
Figure 3:
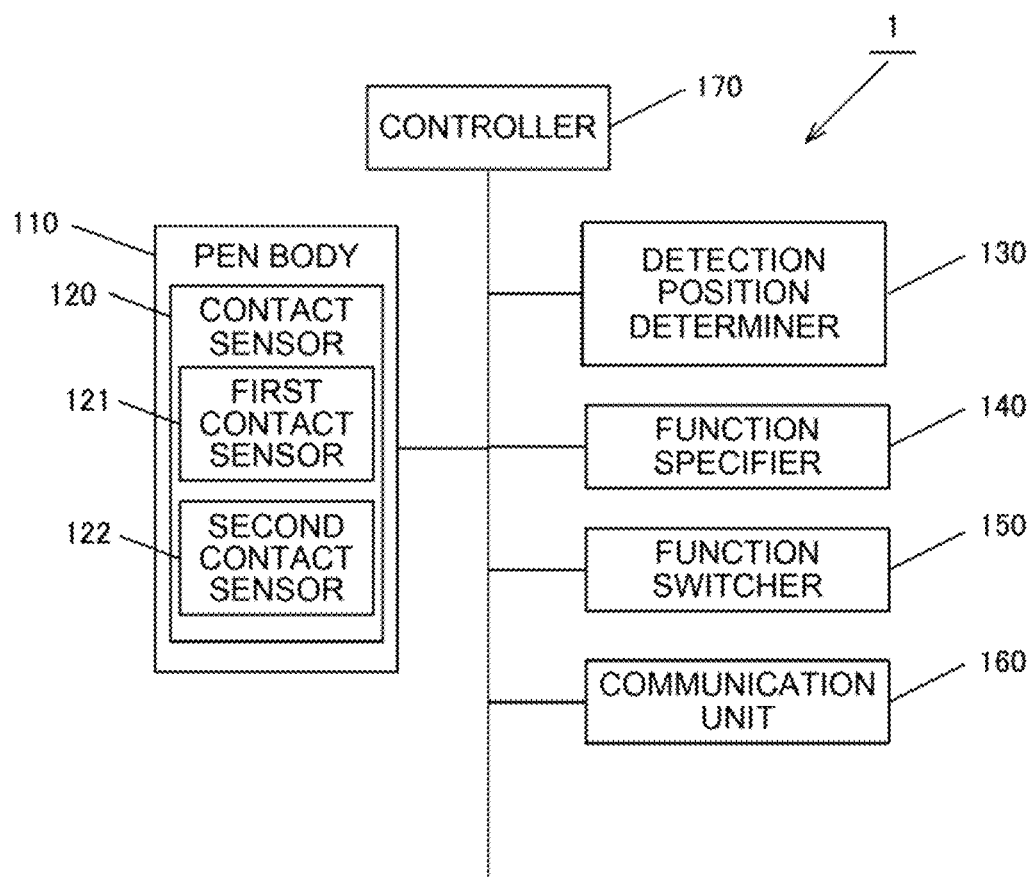
FIG. 3 is a block diagram showing a configuration of the pen-type input device.
Figure 4:
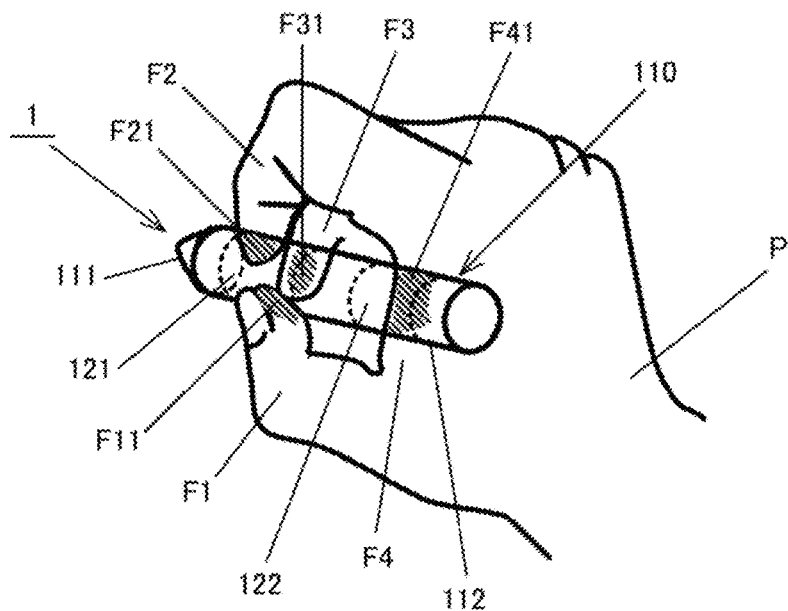
FIG. 4 is an explanatory diagram showing a holding state of the pen-type input device.
Figure 5A:
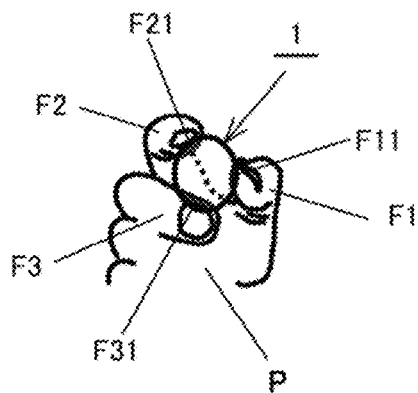
FIGS. 5A and 5B are explanatory diagrams showing a state where the pen-type input device is held by three fingers.
Figure 6A:
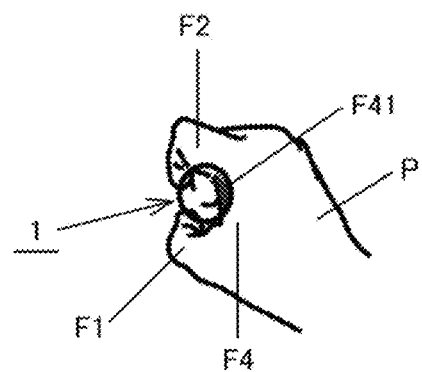
FIGS. 6A and 6B are explanatory diagrams showing a state where the pen-type input device is held by the base portion of a finger.
Figure 5B:
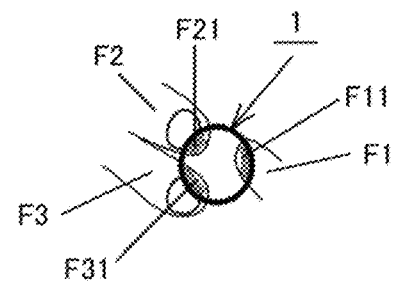
Figure 6B:
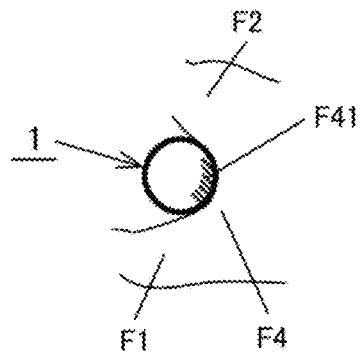

FIG. 1 is an example of an embodiment of the invention, and is an explanatory diagram showing a state in which a pen-type input device according to a first embodiment of the present invention is being used. FIG. 2 is an explanatory diagram showing an overall configuration of the pen-type input device. FIG. 3 is a block diagram showing a configuration of the pen-type input device. FIG. 4 is an explanatory diagram showing a holding state of the pen-type input device. FIGS. 5A and 5B are explanatory diagrams showing a state where the pen-type input device is held by three fingers. FIGS. 6A and 6B are explanatory diagrams showing a state where the pen-type input device is held by the base portion of a finger.

As shown in FIG. 1 and FIG. 2, the first embodiment is a pen-type input device 1 including a pillar-shaped pen body 110, and a first contact sensor 121 and a second contact sensor 122 as a contact sensor 120. A holding position of the pen body 110 is determined based on a detection result of the first contact sensor 121 and the second contact sensor 122, and a function of the pen-type input device 1 is specified according to the holding position in which a user P is holding the pen body 110.

Configuration of Pen-Type Input Device

The pen-type input device 1 has a plurality of functions, and is an input device for use with an information processing device (not shown) capable of receiving input operations by a touch operation on a display screen.

As shown in FIG. 3, the pen-type input device 1 is primarily configured by a pen body 110, a contact sensor 120, a detection position determiner 130, a function specifier 140, a function switcher 150, a communication unit 160, and a controller 170.

As shown in FIG. 2, the pen body 110 has a pen tip 111 on one end, which exhibits a tapered cylindrical shape, a rear end 112 on the other end, and is formed having a cylindrical shape that extends from the pen tip 111 to the rear end 112. The pen body 110 includes a contact sensor 120 which is capable of detection over the entire outer periphery of a portion of the surface.

The shape of the pen body 110 is not limited to a cylindrical shape. For example, it may have a pillar-shaped body with a polygonal shape, such as a hexagonal shape.

The contact sensor 120 includes a first contact sensor 121 on the pen tip 111 side, and a second contact sensor 122 at a position which is separated from the first contact sensor 121 by a predetermined distance toward the rear end 112 side. The spacing between the first contact sensor 121 and the second contact sensor 122 may be empirically set, or may be adjustably configured.

The detection position determiner 130 determines, based on a detection result of the contact sensor 120, the holding position of the holding hand of the user, which is holding the pen body 110. Further, the detection position determiner 130 specifies a holding state of the pen-type input device 1 by the user P, which corresponds to the holding position of the pen body 110.

The function specifier 140 specifies, based on the determination result of the detection position determiner 130, a function from among a plurality of functions provided in the pen-type input device 1 which corresponds to the holding position of the pen-type input device 1.

The function specifier 140 specifies a function which is executed at the time of an operation according to the holding state of the pen-type input device 1 (the orientation, rotation angle, and holding position of the pen-type input device 1) that has been specified based on the determination result of the detection position determiner 130.

The function switcher 150 switches the function so that the function specified by the function specifier 140 is executed.

The communication unit 160 performs a communication connection with the information processing device.

The controller 170 is a functional unit for controlling the overall processing performed by the pen-type input device 1.

Detection of Holding Position of Pen-Type Input Device

Next, the detection by the contact sensor 120 when the pen-type input device 1 according to the first embodiment is held by the user P will be described.

In the first embodiment, when the user P holds the pen-type input device 1, the first contact sensor 121 detects that the pen tip 111 side has been held as shown in FIG. 4. Furthermore, as shown in FIG. 4, FIG. 5A, and FIG. 5B, the first contact sensor 121 detects holding positions F11, F21 and F31 of the thumb F1, the forefinger F2, and the middle finger F3 of the user P.

As shown in FIG. 4, FIG. 6A, and FIG. 6B, when the user P holds the pen-type input device 1, the second contact sensor 122 detects a contact position F41 of a portion F4 between the base of the thumb F1 and the base of the forefinger F2 of the user P.

The holding position of the pen-type input device 1 by the user P is determined by the detection position determiner 130 based on the detection result of the contact positions obtained by the first contact sensor 121 and the second contact sensor 122 when the user P holds the pen-type input device 1. Further, a holding state of the pen-type input device set in advance that corresponds to the holding position is specified.

For example, as shown in FIG. 5A and FIG. 5B, the first contact sensor 121 detects the holding positions F11, F21, and F31 of the thumb F1, the forefinger F2, and the middle finger F3 of the user P. Further, as shown in FIG. 6A and FIG. 6B, the second contact sensor 122 detects the contact position F41 of the portion F4 between the base of the thumb F1 and the base of the forefinger F2 of the user P. Consequently, the detection position determiner 130 determines that the user P is holding the pen tip side.

Furthermore, the second contact sensor 122 may be configured such that the configuration of the detection area corresponds to the function included in the pen-type input device 1, according to the position where the portion F4 between the base of the thumb F1 and the base of the forefinger F2 of the user P makes contact. The function included in the pen-type input device 1 is such as a pen input mode, an eraser mode, a color setting, a line width setting, and a pen type setting. As a result of such a configuration, the function can be switched by simply rotating the pen body 110 in the holding hand.

Moreover, when the portion F4 between the base of the thumb F1 and the base of the forefinger F2 of the user P makes contact with a specific detection area, the second contact sensor 122 may cause a menu to be displayed on a display screen on which an input operation is performed using the pen-type input device 1. As a result of such a configuration, a menu can be easily displayed.

Function Setting Procedure of Pen-Type Input Device

Next, an example of a processing procedure that sets a function of the pen-type input device 1 when the pen-type input device 1 according to the first embodiment is used will be described following a flowchart.

FIG. 7 is a flowchart showing a processing procedure for performing a function setting in the pen-type input device according to the first embodiment.

As shown in FIG. 7, when an input operation is performed using the pen-type input device 1, the user P firstly takes the pen-type input device 1 in a hand, and holds it in a state ready for use (S101). At this time, the contact position of the holding hand of the user P with the contact sensor 120 (the first contact sensor 121 and the second contact sensor 122) of the pen body 110 is detected (S103).

Then, based on the detection result of the contact sensor 120, the holding position of the pen-type input device 1 by the user P is determined by the detection position determiner 130 (S105). Further, based on the determination result of the detection position determiner 130, the function corresponding to the holding position of the pen-type input device 1 is specified by the function specifier 140 (S107).

Next, switching is performed to the function specified by the function switcher 150, and the function executed when an input operation is performed is set (S109).

In this manner, when the user P holds the pen-type input device 1, it is possible for the function which is executed when an input operation is performed to be specified and set according to the holding state.

The specified function setting when the user P holds the pen-type input device 1 may be changed each time the holding position changes.

Alternatively, the setting state may be maintained until the specified setting is canceled.

As a result of the configuration described above, according to the first embodiment, a pen-type input device 1 having a plurality of functions includes a pillar-shaped pen body 110, a contact sensor 120, a detection position determiner 130, and a function specifier 140. Further, the contact sensor 120 detects on the surface of the pen body 110 a holding position of the thumb F1, forefinger F2, and middle finger F3 of the holding hand of the user P, which is holding the pen body 110, and a contact position of portion F4 between the base of the thumb F1 and the base of the forefinger F2 of the holding hand. Therefore, the holding state and the holding position of the user P on the pen body 110 can be accurately determined. Further, based on the determination result, the function of the pen-type input device 1 can be specified according to the holding position of the pen-type input device 1. Consequently, by simply holding the pen body 110, the user P is capable of specifying the input processing which is suitable for an input operation according to the holding position. Therefore, an improvement in the operability of the pen-type input device 1 can be achieved.

Furthermore, in the first embodiment, a first contact sensor 121 on the pen tip 111 side of the pen body 110, and a second contact sensor 122 on the rear end 112 side are provided as the contact sensor 120. As a result, the position in which the pen body 110 is held by a finger of the holding hand of the user P, and the position in which the pen body 110 is held between the base of the thumb F1 and the base of the forefinger F2 can be detected.

Therefore, a state in which the user is holding the pen tip side of the pen-type input device 1 can be accurately detected.

Second Embodiment

Next, a second embodiment will be described with reference to the drawings.

In addition to the configuration of the pen-type input device 1 according to the first embodiment, the second embodiment includes a display that specifies the function that has been specified by a detector. Consequently, the specified function can be confirmed. In the second embodiment, the detector is arranged at a specific position on the outer periphery of the pen body.

Figure 8:
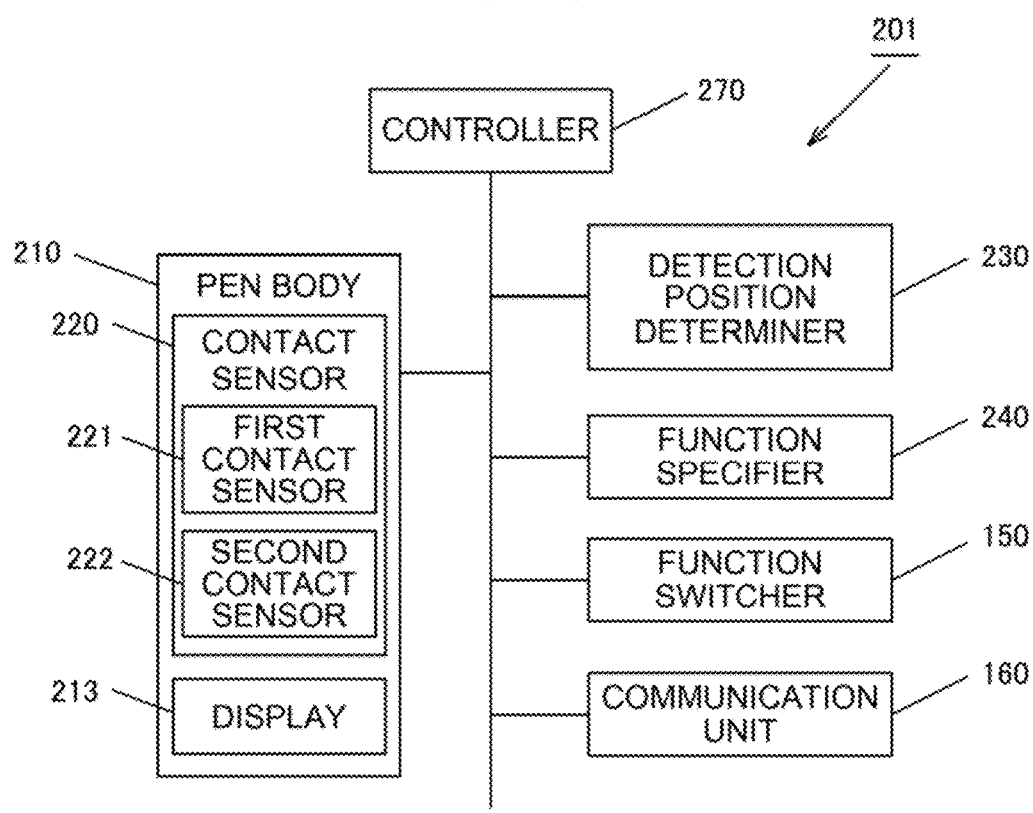
FIG. 8 is a block diagram showing a configuration of a pen-type input device according to a second embodiment.
Figure 9:
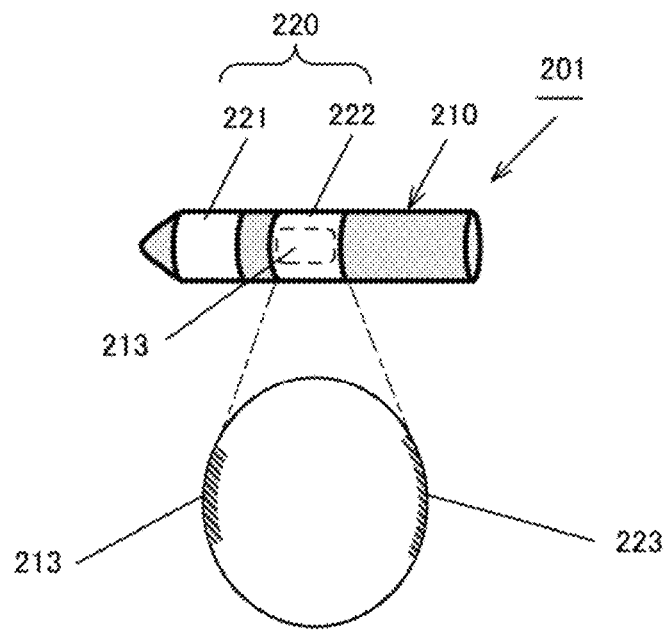
FIG. 9 is an explanatory diagram showing an example of a display that displays a function set in the pen-type input device on the pen body.
Figure 10:
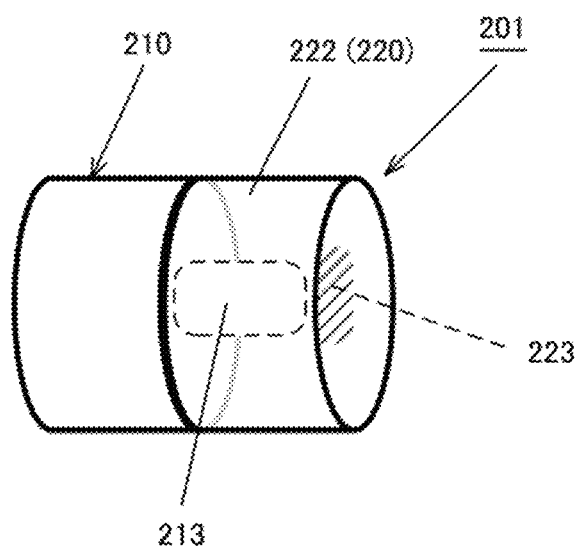
FIG. 10 is an explanatory diagram showing the positional relationship between the display and a contact sensor.
Figure 11A:
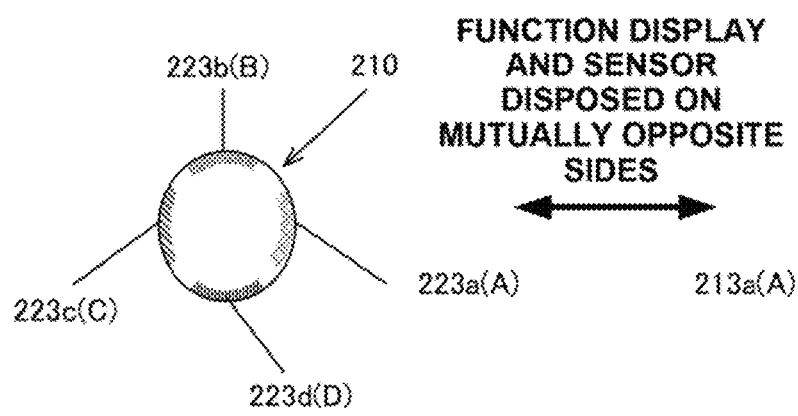
FIG. 11A is an explanatory diagram showing the positional relationship of the contact sensor, which corresponds to a function, on the pen body.
Figure 11B:
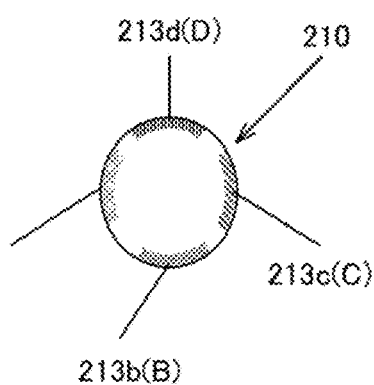
FIG. 11B is an explanatory diagram showing the positional relationship between a contact sensor and a display on the pen body.

FIG. 8 is a block diagram showing a configuration of a pen-type input device according to a second embodiment. FIG. 9 is an explanatory diagram showing an example of the positional relationship between a detector and a display on the pen body of the pen-type input device. FIG. 10 is an enlarged explanatory diagram showing an example of the positional relationship between the display and a contact sensor on the pen body. FIG. 11A is an explanatory diagram showing the positional relationship between a plurality of detectors on the pen body. FIG. 11B is an explanatory diagram showing the positional relationship between a plurality of displays that correspond to the plurality of detectors on the pen body.

In addition, for convenience of description, the same reference numerals are given to those configurations having the same functions as in the first embodiment, and the description will be omitted.

As shown in FIG. 8, FIG. 9, and FIG. 10, the pen-type input device 201 according to the second embodiment includes, at a specific position (a position on the opposite side which opposes a specific detection position) on the surface of the pen body 210 that corresponds to the specific detection position of a contact sensor 220, a display 213 that specifies a function (information relating to a function) that has been specified by the specified detection position.

Configuration of Pen-Type Input Device

As shown in FIG. 8, the pen-type input device 201 is primarily configured by a pen body 210, a contact sensor 220, a detection position determiner 230, a function specifier 240, a function switcher 150, a communication unit 160, and a controller 270, and further includes a display 213.

As shown in FIG. 9, the pen-type input device 201 includes, as the contact sensor 220 on the pen body 210, a first contact sensor 221 and a second contact sensor 222.

The first contact sensor 221 is configured to function in the same manner as the first contact sensor 121 of the pen-type input device 1 according to the first embodiment.

The second contact sensor 222 is provided with a plurality of detectors 223 in a predetermined area on the outer periphery of the pen body 210. In the second embodiment, the respective functions that are specified by the plurality of detectors 223 are set.

The display 213, which displays content relating to the function specified by the detectors 223, is provided on the outer periphery of the pen body 210 in specific positions that correspond to the plurality of detectors 223.

When the user P holds the pen body 210, the detection position determiner 230 determines the holding position of the user P according to the detector 223 of the second contact sensor 222 that detects the holding hand of the user P.

The function specifier 240 specifies, based on the determination result of the detection position determiner 230, the function set in advance that corresponds to the detector 223 that has detected the holding hand.

For example, as shown in FIG. 9 and FIG. 10, the specified function is set when the detector 223 of the second contact sensor 222 detects the holding hand. Further, the display 213 is provided on the outer periphery of the pen body 210 at a position that opposes the detector 223.

The display 213 may be one in which the setting information that has been set, which corresponds to the detector 223, is always displayed by being printed, engraved, or the like. Furthermore, the display 213 may also display the setting information when the detector 223 is in a detected state. Here, the setting information is displayed on the display 213 at a position that opposes the detector 223 (a position on the opposite side).

Positional Relationship Between Detector and Display on Pen Body

As shown in FIG. 11A, in the second embodiment, detectors 223a, 223b, 223c and 223d are provided as the detector 223 of the second contact sensor 222 at four positions on the outer periphery of the pen body 210. Further, as shown in FIG. 11B, displays 213a, 213b, 213c and 213d are respectively provided as the display 213 at specific positions on the outer periphery of the pen body 210, which correspond to each of the detectors 223a, 223b, 223c and 223d.

In the second embodiment, the detectors 223a, 223b, 223c and 223d provided at four positions on the outer periphery of the pen body 210 are each set so as to correspond to different functions. The function settings are provided with four settings A, B, C and D.

Further, when the detectors 223a, 223b, 223c, and 223d detect contact by the user, the specific setting information that corresponds to each of the settings A, B, C and D is displayed on the displays 213a, 213b, 213c and 213d. The number of settings is not limited to four settings.

Hereinafter, the setting of functions specified by the detector 223 of the second contact sensor 222 of the pen-type input device 201 according to the second embodiment will be described giving examples.

Example 1

In Example 1, the "line thickness" is set using the second contact sensor 222.

FIG. 12 is a table showing the settings in Example 1 for setting a line thickness in the pen-type input device according to the second embodiment.

As shown in FIG. 12, in Example 1, the line thickness setting has the four settings A, B, C and D. The respective settings correspond to the detectors 223a, 223b, 223c and 223d of the second contact sensor 222, thereby setting the line thickness.

In setting A, a very thin line is set when the detector 223a detects contact by the user. At this time, the display 213a displays "very thin".

In setting B, a normal line thickness (a preset line thickness) is set when the detector 223b detects contact by the user. At this time, the display 213b displays "normal" (or "standard").

In setting C, a thick line is set when the detector 223c detects contact by the user. At this time, the display 213c displays "thick".

In setting D, a very thick line is set when the detector 223d detects contact by the user. At this time, the display 213d displays "very thick".

The display relating to the line thickness displayed on the displays 213a, 213b, 213c and 213d may be represented by numerical values such as 1, 2, 3, and so on.

Example 2

In Example 2, the "eraser setting (1)" is set using the second contact sensor 222.

FIG. 13 is a table showing the settings in Example 2 for performing an eraser setting in the pen-type input device according to the second embodiment.

As shown in FIG. 13, in Example 2, the eraser setting (1) has the four settings A, B, C and D. The respective settings correspond to the detectors 223a, 223b, 223c and 223d of the second contact sensor 222, thereby setting the erasure width (erasure area) of the eraser.

In setting A, a normal input (pen input) which is not an eraser is set when the detector 223a detects contact by the user. At this time, the display 213a displays "pen input".

In setting B, an eraser having a thin erasure width is set when the detector 223b detects contact by the user. At this time, the display 213b displays "eraser (thin)".

In setting C, an eraser having a normal erasure width (a preset erasure width) is set when the detector 223c detects contact by the user. At this time, the display 213c displays "eraser (normal)".

In setting D, an eraser having a thick erasure width is set when the detector 223d detects contact by the user. At this time, the display 213d displays "eraser (thick)".

The display relating to the erasure width of the eraser displayed on the displays 213a, 213b, 213c and 213d may be represented by numerical values such as 1, 2, 3, and so on.

Example 3

In Example 3, the "eraser setting (2)" is set using the second contact sensor 222.

FIG. 14 is a table showing the settings in Example 3 for performing an eraser setting in the pen-type input device according to the second embodiment.

As shown in FIG. 14, in Example 3, the eraser setting (2) has the four settings A, B, C and D. The respective settings correspond to the detectors 223a, 223b, 223c and 223d of the second contact sensor 222, thereby setting the erasure method (drawing method) by the eraser.

In setting A, a normal input (pen input) which is not an eraser is set when the detector 223a detects contact by the user. At this time, the display 213a displays "pen input".

In setting B, selected erasure which erases a contact path is set when the detector 223b detects contact by the user. At this time, the display 213b displays "eraser (selected erasure)".

In setting C, normal erasure (erasure according to a preset erasure width) which erases a passage path is set when the detector 223c detects contact by the user. At this time, the display 213c displays "eraser (normal erasure)".

In setting D, blurred erasure that results in thinning according to the passage frequency is set when the detector 223d detects contact by the user. At this time, the display 213d displays "eraser (blurred erasure)".

Example 4

In Example 4, the "pen type" is set using the second contact sensor 222.

FIG. 15 is a table showing the settings in Example 4 for performing a pen type setting in the pen-type input device according to the second embodiment.

As shown in FIG. 15, in Example 4, the pen type setting has the four settings A, B, C and D. The respective settings correspond to the detectors 223a, 223b, 223c and 223d of the second contact sensor 222, thereby setting the pen type.

In setting A, a normal pen input is set when the detector 223a detects contact by the user. At this time, the display 213a displays "pen input".

In setting B, a brush is set when the detector 223b detects contact by the user. At this time, the display 213b displays "brush".

In setting C, an input to fill with a marker is set when the detector 223c detects contact by the user. At this time, the display 213c displays "marker (fill)".

In setting D, an input to highlight with a marker is set when the detector 223d detects contact by the user. At this time, the display 213d displays "marker (highlight)".

Example 5

In Example 5, the "line type" is set using the second contact sensor 222.

FIG. 16 is a table showing the settings in Example 5 for performing a line type setting in the pen-type input device according to the second embodiment.

As shown in FIG. 16, in Example 5, the line type setting has the four settings A, B, C and D. The respective settings correspond to the detectors 223a, 223b, 223c and 223d of the second contact sensor 222, thereby setting the line type.

In setting A, a normal line input is set when the detector 223a detects contact by the user. At this time, the display 213a displays "normal".

In setting B, a double line input is set when the detector 223b detects contact by the user. At this time, the display 213b displays "double line".

In setting C, a wavy line input is set when the detector 223c detects contact by the user. At this time, the display 213c displays "wavy line".

In setting D, a dotted line input is set when the detector 223d detects contact by the user. At this time, the display 213d displays "dotted line".

Example 6

In Example 6, a "graphic input" is set using the second contact sensor 222.

FIG. 17 is a table showing the settings in Example 6 for performing a graphic input setting in the pen-type input device according to the second embodiment.

As shown in FIG. 17, in Example 6, the graphic input setting has the four settings A, B, C and D. The respective settings correspond to the detectors 223a, 223b, 223c and 223d of the second contact sensor 222, thereby setting the graphic input.

In setting A, drawing with a normal pen set when the detector 223a detects contact by the user. At this time, the display 213a displays "pen".

In setting B, drawing using a straight line is set when the detector 223b detects contact by the user. At this time, the display 213b displays "straight line".

In setting C, drawing using a square image (graphic) is set when the detector 223c detects contact by the user. At this time, the display 213c displays "square".

In the setting D, drawing using a circular graphic is set when the detector 223d detects contact by the user. At this time, the display 213d displays "circle".

Example 7

In Example 7, the "editing" function is set using the second contact sensor 222.

FIG. 18 is a table showing the settings in Example 7 for performing perform an edit setting in the pen-type input device according to the second embodiment.

As shown in FIG. 18, in Example 7, the editing setting has the four settings A, B, C and D. The respective settings correspond to the detectors 223a, 223b, 223c and 223d of the second contact sensor 222, thereby setting the editing function.

In setting A, an editing function using a normal pen is set when the detector 223a detects contact by the user. At this time, the display 213a displays "pen".

In setting B, a function that moves the image by page feeding, scrolling, or the like, is set when the detector 223b detects contact by the user.

At this time, the display 213b displays "swipe".

In setting C, a function that selects an image by a touch operation, moves an image while being touched (drag operation), places an image where a touch operation is released (drop operation), or the like, is set when the detector 223c detects contact by the user. At this time, the display 213c displays "move".

In setting D, a function that creates a text box is set when the detector 223d detects contact by the user. At this time, the display 213d displays "text box".

Example 8

In Example 8, the "pen input mode" is set using the second contact sensor 222.

FIG. 19 is a table showing the settings in Example 8 for performing a pen input mode setting in the pen-type input device according to the second embodiment.

As shown in FIG. 19, in Example 8, the pen input mode setting has the four settings A, B, C and D. The respective settings correspond to the detectors 223a, 223b, 223c and 223d of the second contact sensor 222, thereby setting the pen input mode.

In setting A, a normal input mode for performing input using a normal pen is set when the detector 223a detects contact by the user. At this time, the display 213a displays "pen".

In setting B, an eraser mode that erases a drawing is set when the detector 223b detects contact by the user. At this time, the display 213b displays "eraser".

In setting C, a menu display mode that displays a menu is set when the detector 223c detects contact by the user. At this time, the display 213c displays "menu".

In setting D, a select tool mode is set when the detector 223d detects contact by the user. At this time, the display 213d displays "selection tool".

As a result of the above configuration, according to the second embodiment, in the pen-type input device 201, a plurality of detectors 223 that detect at specific positions are provided in the second contact sensor 222 provided on the pen body 210, and a display 213 that corresponds to the detector 223 that specifies the function that has been specified by the detector 223 is provided at a specific position (on the opposite side) on the surface of the pen body 210. As a result, the function can be changed in a state where the user P is holding the pen body 210 by simply changing the detector 223 with which contact is made. Further, the changed content of the function can be easily confirmed on the display 213 on hand.

Furthermore, as the configuration of the display 213, when the detectors 223a, 223b, 223c and 223d detect contact by the user P, the displays 213a, 213b, 213c and 213d and the like are provided in an area on the opposite side to the side surface of the pen body 210 positioned between the base of the thumb F1 and the base of the forefinger F2, in a position which is visible. Therefore, the function that has been set can be easily confirmed by the display 213 at hand without confirming a predetermined position of the display screen on which the input path is displayed.

Third Embodiment

Next, a third embodiment will be described with reference to the drawings.

In addition to the configuration of the pen-type input device 1 according to the first embodiment, and in a similar manner to the second embodiment, the third embodiment includes a display that specifies the function that has been specified, which enables the specified function to be confirmed. In the third embodiment, a detector is arranged on the outer periphery of the pen body with a predetermined angular position which is set in advance.

Figure 20:
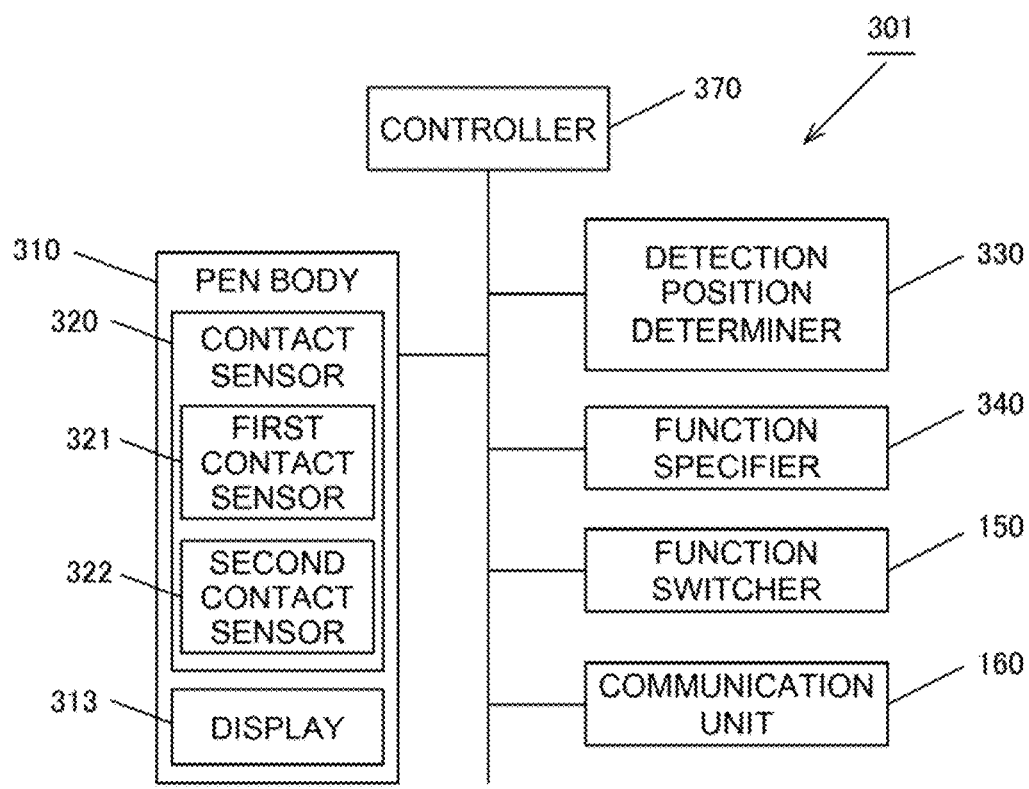
FIG. 20 is a block diagram showing a configuration of a pen-type input device according to a third embodiment.
Figure 21:
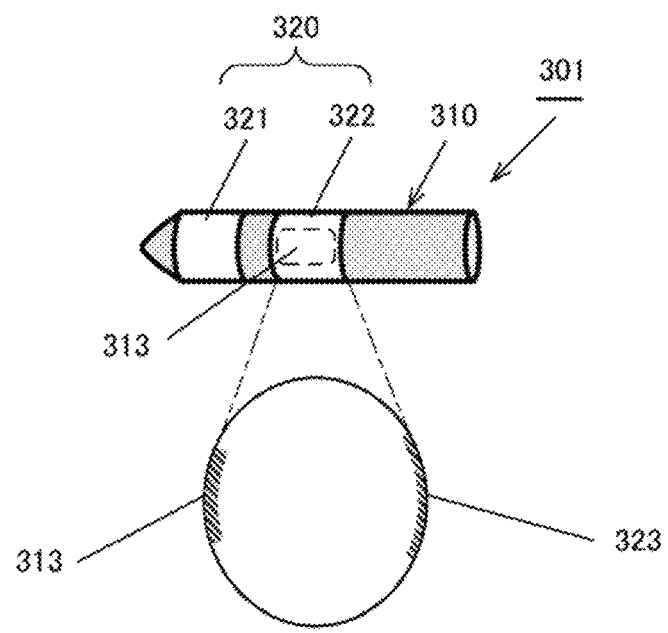
FIG. 21 is an explanatory diagram showing an example of the positional relationship between a detector and a display on the pen body of the pen-type input device.

FIG. 20 is a block diagram showing a configuration of a pen-type input device according to a third embodiment. FIG. 21 is an explanatory diagram showing an example of the positional relationship between a detector and a display on the pen body of the pen-type input device. FIG. 22A is an explanatory diagram showing the positional relationship between a plurality of detectors on the pen body of the pen-type input device according to the third embodiment. FIG. 22B is an explanatory diagram showing the positional relationship between a plurality of displays that correspond to the plurality of detectors on the pen body.

In addition, for convenience of description, the same reference numerals are given to those configurations having the same functions as in the first embodiment or the second embodiment, and the description will be omitted.

As shown in FIGS. 22A and 22B, in addition to the configuration of the pen-type input device 1, the pen-type input device 301 according to the third embodiment includes, at a specific position (a position on the opposite side which opposes a specific detection position) on the surface of the pen body 310 corresponding to the specific detection positions of contact sensors 320, a display 313 that specifies a function (information relating to a function) that has been specified by a detection position.

Configuration of Pen-Type Input Device

As shown in FIG. 20, the pen-type input device 301 is configured in the same manner as the pen-type input device 201 of the second embodiment, and is primarily configured by a pen body 310, a contact sensor 320, a detection position determiner 330, a function specifier 340, a function switcher 150, a communication unit 160, a controller 370, and a display 313.

As shown in FIG. 21, the pen-type input device 301 includes, as the contact sensor 320 on the pen body 310, a first contact sensor 321 and a second contact sensor 322.

The first contact sensor 321 is configured to function in the same manner as the first contact sensor 221 of the pen-type input device 201 according to the second embodiment.

The second contact sensor 322 is provided with a plurality of detectors 323 in a predetermined area on the outer periphery of the pen body 310. In the third embodiment, the respective functions that are specified by the plurality of detectors 323 are set.

The display 313, which displays content relating to the function specified by the detector 323, is provided on the outer periphery of the pen body 310 in specific positions that correspond to the plurality of detectors 323.

When the user P holds the pen body 310, the detection position determiner 330 determines the holding position of the user P according to the detector 323 of the second contact sensor 322 that detects the holding hand of the user P.

The function specifier 340 specifies, based on the determination result of the detection position determiner 330, the function set in advance that corresponds to the detector 323 that has detected the holding hand.

The configuration of the pen-type input device 301 according to the third embodiment is the same configuration as the pen-type input device 201 according to the second embodiment, and the details conform to the description of the second embodiment.

Positional Relationship Between Detector and Display on Pen Body

As shown in FIG. 22A, in the third embodiment, detectors 323a, 323b, 323c, 323d, 323e and 323f are provided as the detector 323 of the second contact sensor 322 at six positions on the outer periphery of the pen body 310, at predetermined angles set beforehand. Further, as shown in FIG. 22B, displays 313a, 313b, 313c, 313d, 313e and 313f are respectively provided as the display 313 at specific positions on the outer periphery of the pen body 310 that correspond to each of the detectors 323a, 323b, 323c, 323d, 323e and 323f.

As shown in FIG. 22A, in the third embodiment, taking the position of the detector 323a on the outer periphery of the pen body 310 as a reference angle of 0° (360°), the detector 323b is provided with a set angle of 60°, the detector 323c is provided with a set angle of 120°, the detector 323d is provided with a set angle of 180°, the detector 323e is provided with a set angle of 240°, and the detector 323f is provided with a set angle of 300°.

Further, the detectors 323a, 323b, 323c, 323d, 323e and 323f are each set so as to correspond to different functions. The function settings are provided with six settings A, B, C, D, E and F.

Further, when the detectors 323a, 323b, 323c, 323d, 323e and 323f detect contact by the user, the specific setting information that corresponds to each of the settings A, B, C, D, E and F is displayed on the displays 313a, 313b, 313c, 313d, 313e and 313f. The number of settings is not limited to six settings.

Hereinafter, the setting of functions specified by the detector 323 of the second contact sensor 322 of the pen-type input device 301 according to the third embodiment will be described giving examples.

Example 1

In Example 1, the "pen input color" is set using the second contact sensor 322.

FIG. 23 is a table showing the settings in Example 1 for setting a pen input color in the pen-type input device according to the third embodiment.

As shown in FIG. 23, in Example 1, the pen input color setting has the six settings A, B, C, D, E and F. The respective settings correspond to the detectors 323a, 323b, 323c, 323d, 323e and 323f of the second contact sensor 322, thereby setting the pen input color.

In setting A, red is set when the detector 323a at the reference angle of 0° detects contact by the user. At this time, the display 313a displays "red".

In setting B, yellow set when the detector 323b at a setting angle of 60° detects contact by the user. At this time, the display 313b displays "yellow".

In setting C, green is set when the detector 323c at a setting angle of 120° detects contact by the user. At this time, the display 313c displays "green".

In setting D, cyan is set when the detector 323d at a setting angle of 180° detects contact by the user. At this time, the display 313d displays "cyan".

In setting E, blue is set when the detector 323e at a setting angle of 240° detects contact by the user. At this time, the display 313e displays "blue".

In setting F, magenta is set when the detector 323f at a setting angle of 300° detects contact by the user. At this time, the display 313f displays "magenta".

As a result, when the pen input color is set, it is not necessary to confirm which color has been set by a menu on the display screen or the like. Therefore, the color can be easily confirmed by simply looking at the display 313 on the pen body 310 of the pen-type input device 301.

The switching of the displayed color from the display 313a to the display 313b, from the display 313b to the display 313c, and so on may be consecutively switched upon switching the detector 323 that detects that contact has been made by the user.

Furthermore, in Example 1, the hue of the pen input color is switched. However, the brightness (difference in density) and vividness of the pen input color may also be changed.

Example 2

In Example 2, the "line width" of the pen input is set using the second contact sensor 322.

FIG. 24 is a table showing the settings in Example 2 for setting a line width of a pen input in the pen-type input device according to the third embodiment.

As shown in FIG. 24, in Example 2, the line width setting of the pen input has the four settings A, B, C and D. The respective settings correspond to the detectors 323a, 323b, 323c and 323d of the second contact sensor 322, thereby setting the line width of the pen input.

In setting A, the standard line width is set when the detector 323a at the reference angle of 0° detects contact by the user. At this time, the display 313a displays "normal".

In setting B, a thick line width is set when the detector 323b at a setting angle of 90° detects contact by the user. At this time, the display 313b displays "thick".

In setting C, a standard line width is set when the detector 323c at a setting angle of 180° detects contact by the user. At this time, the display 313c displays "normal".

In setting D, a thin line width is set when the detector 323d at a setting angle of 270° detects contact by the user. At this time, the display 313d displays "thin".

The line width setting of a pen input is not limited to the line widths described above.

As a result of the above configuration, according to the third embodiment, in the pen-type input device 301, a plurality of detectors 323 that detect at angular positions set in advance are provided in the second contact sensor 322 provided on the pen body 310, and a display 313 that corresponds to the detector 323 that specifies the function that has been specified by the detector 323 is provided at a specific position (on the opposite side) on the surface of the pen body 310. As a result, the function that corresponds to the detector 323 can be changed in a state where the user P is holding the pen body 310 by changing the detector 323 with which contact is made. Further, the changed content of the function can be easily confirmed on the display 313 on hand.

Furthermore, as the configuration of the display 313, when the detectors 323a, 323b, 323c and 323d detect contact by the user P, the displays 313a, 313b, 313c and 313d and the like are provided in an area on the opposite side to the side surface of the pen body 310 positioned between the base of the thumb F1 and the base of the forefinger F2, in a position which is visible to the user. Therefore, the function that has been set can be easily confirmed by the display 313 on hand without confirming a predetermined position of the display screen on which the input path is displayed.

Fourth Embodiment

Next, a fourth embodiment will be described with reference to the drawings.

In the fourth embodiment, in addition to the configuration of the pen-type input device 1 according to the first embodiment, a function is set according to the holding position along the longitudinal direction of the pen body, at which he holding hand is holding the pen body.

Figure 25:
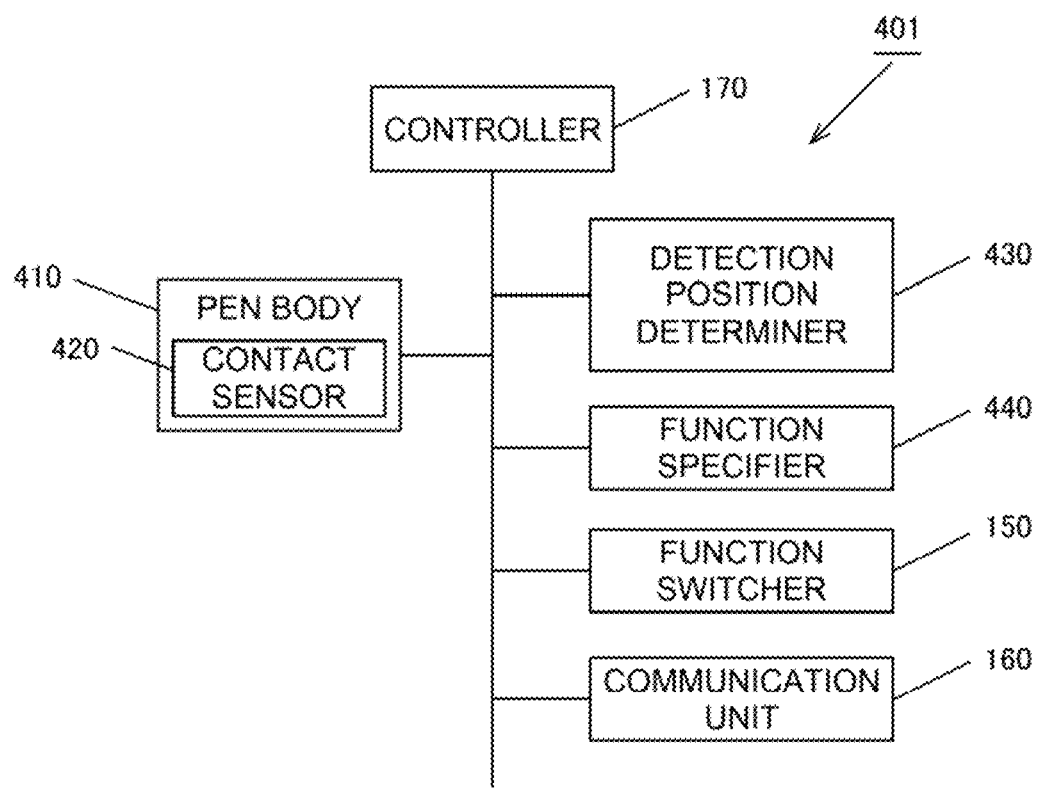
FIG. 25 is a block diagram showing a configuration of a pen-type input device according to a fourth embodiment.
Figure 26:
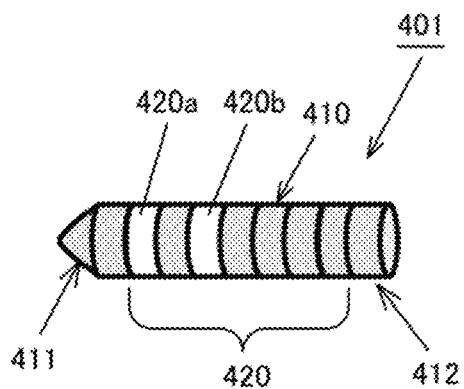
FIG. 26 is an explanatory diagram showing an example of a detection state of the contact sensor when a pen tip side of the pen body of the pen-type input device is held.
Figure 27:
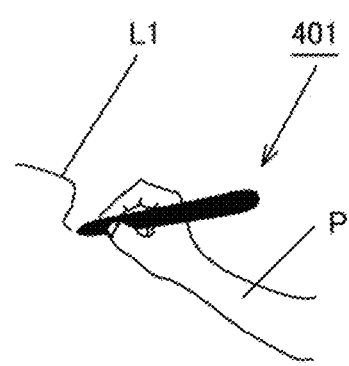
FIG. 27 is an explanatory diagram showing an example an input operation performed in a state where the pen tip side of the pen body is held.
Figure 28:
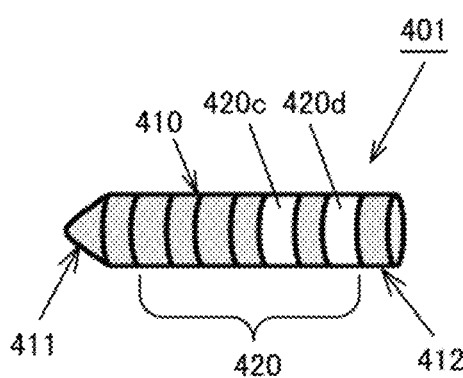
FIG. 28 is an explanatory diagram showing an example of a detection state of a contact sensor when the rear end side of the pen body is held.
Figure 29:
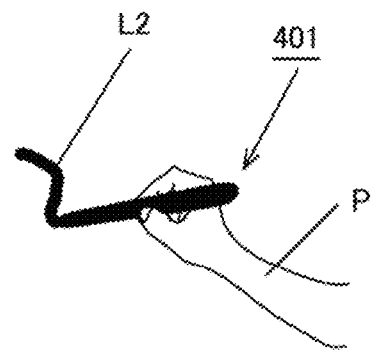
FIG. 29 is an explanatory diagram showing an example an input operation performed in a state where the rear end side of the pen body is held.

FIG. 25 is a block diagram showing a configuration of a pen-type input device according to a fourth embodiment. FIG. 26 is an explanatory diagram showing an example of a detection state of a contact sensor when the pen tip side of the pen body of the pen-type input device is held. FIG. 27 is an explanatory diagram showing an example an input operation performed in a state where the pen tip side of the pen body is held. FIG. 28 is an explanatory diagram showing an example of a detection state of a contact sensor when the rear end side of the pen body is held. FIG. 29 is an explanatory diagram showing an example an input operation performed in a state where the rear end side of the pen body is held.

In addition, for convenience of description, the same reference numerals are given to those configurations having the same functions as in the first embodiment, and the description will be omitted.

As shown in FIG. 25, in addition to the configuration of the pen-type input device 1, the pen-type input device 401 according to the fourth embodiment includes, as a function of the detection position determiner 430, detection of the holding position along the longitudinal direction of the pen body 410, at which the holding hand is holding the pen body 410, according to a detection result of the contact sensor 420.

Configuration of Pen-Type Input Device

The pen-type input device 401 is primarily configured by a pen body 410, a contact sensor 420, a detection position determiner 430, a function specifier 440, a function switcher 150, a communication unit 160, and a controller 170.

As shown in FIG. 26 and FIG. 28, the pen-type input device 401 includes a contact sensor 420 in at least three positions on the pen body 410 along the longitudinal direction of the pen body 410. In the fourth embodiment, the contact sensors 420a, 420b, 420c and 420d are arranged as the contact sensor 420.

When the user P holds the pen body 410, the detection position determiner 430 determines the holding position of the user P according to position of the second contact sensor 420 that detects the holding hand of the user P.

Specifically, as shown in FIG. 26, when the user P holds the pen tip 411 side of the pen body 410, the contact sensors 420a and 420b on the pen tip 411 side detect the holding hand of the user P. The detection position determiner 430 determines that the user P is holding the pen tip 411 side of the pen body 410 based on the detection result.

On the other hand, as shown in FIG. 28, when the user P holds the rear end 412 side of the pen body 410, the contact sensors 420c and 420d on the rear end 412 side detect the holding hand of the user P. The detection position determiner 430 determines that the user P is holding the rear end 412 side of the pen body 410 based on the detection result.

The function specifier 440 specifies, based on the determination result of the detection position determiner 430, a function from among the plurality of functions provided in the pen-type input device 401 that corresponds to the holding position of the pen-type input device 1.

In the fourth embodiment, the function specifier 440 specifies, based on the determination result of the detection position determiner 430, the appropriate function according to the position of the holding hand of the user P.

For example, as shown in FIG. 26, when it is determined that the holding position of the pen body 410 is close to the pen tip on the pen tip 411 side, a function that inputs a thin path is set. Specifically, as shown in FIG. 27, the thin line function, which requires a precise position accuracy to draw a thin line L1, is correspondingly set when the pen tip side of the pen tip 411 is held short.

On the other hand, as shown in FIG. 28, when it is determined that the holding position of the pen body 410 is far from the pen tip and is on the rear end 412 side, a function that inputs a thick path is set. Specifically, as shown in FIG. 29, the thick line function or the marker function, in which a rough position accuracy is sufficient for drawing a thick line L2, is correspondingly set when the pen tip side of the pen tip 411 is held long.

As a result of the above configuration, according to the fourth embodiment, in the pen-type input device 401, as a function of the detection position determiner 430, the holding position along the longitudinal direction of the pen body 410, at which the holding hand is holding the pen body 410, is determined based on the detection result of the contact sensor 420 at three or more positions. Therefore, the function specifier 340 is capable of specifying the appropriate function according to the holding position of the holding hand of the user P.

In the fourth embodiment, the holding position along the longitudinal direction of the pen body 410 is switched between the two positions on the pen tip side and the rear end side, which enables switching between the two settings for drawing a thin line L1 or a thick line L2. However, the number of settings is not limited to this. For example, the holding position may be determined as the pen tip side, the central side, or the rear end side, and the like, such that switching according to the holding position is possible between three or more settings.

Fifth Embodiment

Next, a fifth embodiment will be described with reference to the drawings.

In the fifth embodiment, like the fourth embodiment, a function is set according to the holding position along the longitudinal direction of the pen body, at which holding hand is holding the pen body. In the fifth embodiment, a plurality of contact sensors is consecutively arranged along the longitudinal direction of the pen body.

Figure 30:
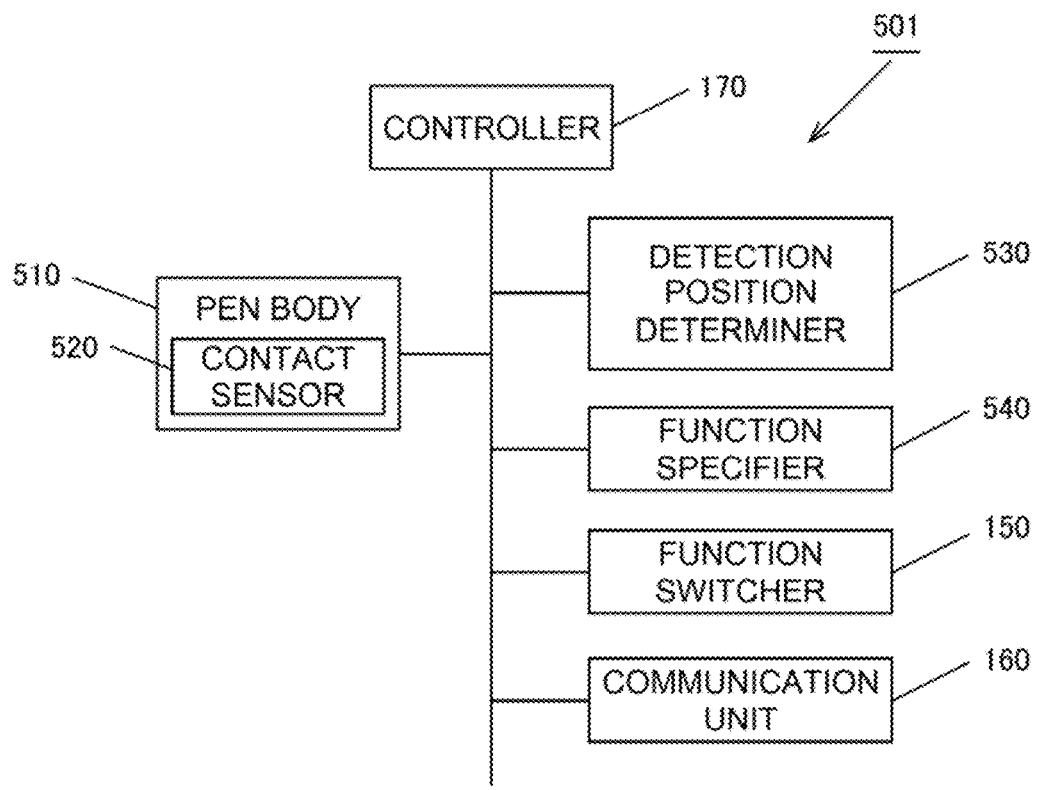
FIG. 30 is a block diagram showing a configuration of a pen-type input device according to a fifth embodiment.
Figure 31:
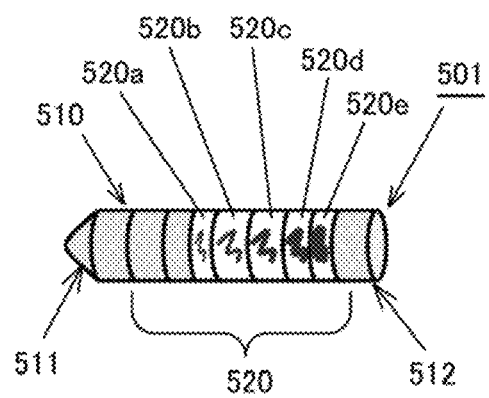
FIG. 31 is an explanatory diagram showing an example of a configuration of the pen body that constitutes the pen-type input device.

FIG. 30 is a block diagram showing a configuration of a pen-type input device according to a fifth embodiment. FIG. 31 is an explanatory diagram showing an example of a configuration of the pen body that constitutes the pen-type input device.

In addition, for convenience of description, the same reference numerals are given to those configurations having the same functions as in the first embodiment, and the description will be omitted.

As shown in FIG. 30, the pen-type input device 501 according to the fifth embodiment has a plurality of contact sensors 520 consecutively arranged along the longitudinal direction of the pen body 510 instead of the configuration of the pen body 410 of the pen-type input device 401.

Configuration of Pen-Type Input Device

The pen-type input device 501 is primarily configured by a pen body 510, a contact sensor 520, a detection position determiner 530, a function specifier 540, a function switcher 150, a communication unit 160, and a controller 170.

As shown in FIG. 31, the pen-type input device 501 has contact sensors 520a, 520b, 520c, 520d and 520e consecutively arranged on the pen body 510 in the vicinity of a central portion along the longitudinal direction of the pen body 510.

When the user P holds the pen body 510, the detection position determiner 530 determines the holding position of the user P according to position of the second contact sensor 520 that detects the holding hand of the user P.

The function specifier 540 specifies, based on of the determination result of the detection position determiner 530, the function from among the plurality of functions provided in the pen-type input device 501 that corresponds to the holding position of the pen-type input device 1.

In the fifth embodiment, the specific functions are set so as to correspond to the plurality of contact sensors 520*a*, 520*b*, 520*c*, 520*d* and 520*e*.

When the user P holds the pen body 510, a detection state is specified by the contact sensor 520 according to the holding position of the pen body 510. The contact sensor 520 is specified based on the determination result from the detection position determiner 530. Then, the function associated with the specified contact sensor 520 is specified by the function specifier 540, and a specific function setting is performed.

In the fifth embodiment, the contact sensors 520*a*, 520*b*, 520*c*, 520*d* and 520*e* along the longitudinal direction of the pen body 510 are provided with settings such as A, B, C, D and E, such that they each correspond to a different function.

Hereinafter, the setting of functions specified by the contact sensor 520 of the pen-type input device 501 according to the fifth embodiment will be described giving examples.

Example 1

In Example 1, the "line thickness" is set using the contact sensor 520.

FIG. 32 is a table showing the settings in Example 1 for setting a line thickness in the pen-type input device according to the fifth embodiment.

As shown in FIG. 32, in Example 1, the line thickness setting has the five settings A, B, C, D and E. The respective settings correspond to the contact sensors 520*a*, 520*b*, 520*c*, 520*d* and 520*e*, thereby setting the line thickness.

In setting A, a very thin line is set when the contact sensor 520*a* detects contact by the user.

In setting B, a thin line is set when the contact sensor 520*b* detects contact by the user.

In setting C, a normal line thickness (a preset line thickness) is set when the contact sensor 520*c* detects contact by the user.

In setting D, a thick line is set when the contact sensor 520*d* detects contact by the user.

In setting E, a very thick line is set when the contact sensor 520*e* detects contact by the user.

Example 2

In Example 2, the "eraser setting (1)" is set using the contact sensor 520.

FIG. 33 is a table showing the settings in Example 2 for performing an eraser setting in the pen-type input device according to the fifth embodiment.

As shown in FIG. 33, in Example 2, the eraser setting (1) has the five settings A, B, C, D and E. The respective settings correspond to the contact sensors 520*a*, 520*b*, 520*c*, 520*d* and 520*e*, thereby setting the erasure width (erasure area) of the eraser.

In setting A, a normal input (pen input) which is not an eraser is set when the contact sensor 520*a* detects contact by the user.

In setting B, an eraser having a thin erasure width is set when the contact sensor 520*b* detects contact by the user.

In setting C, an eraser having a normal erasure width (a preset erasure width) is set when the contact sensor 520*c* detects contact by the user.

In setting D, an eraser having a thick erasure width is set when the contact sensor 520*d* detects contact by the user.

In setting E, an eraser having a very thick erasure width is set when the contact sensor 520*e* detects contact by the user.

In Example 2, the required positional accuracy increases as the area representing the pen path or the eraser effect (processing) is reduced (and represents a thinner line). Therefore, holding positions close to the pen tip are used. Furthermore, the required positional accuracy decreases as the area representing the pen path or the eraser effect (processing) becomes larger (and represents a thicker line). Therefore, holding positions further from the pen tip are used.

Example 3

In Example 3, the "eraser setting (2)" is set using the contact sensor 520.

FIG. 34 is a table showing the settings in Example 3 for performing an eraser setting in the pen-type input device according to the fifth embodiment.

As shown in FIG. 34, in Example 3, the eraser setting (2) has the five settings A, B, C, D and E. The respective settings correspond to the contact sensors 520*a*, 520*b*, 520*c*, 520*d* and 520*e*, thereby setting the erasure method (drawing method) by the eraser.

In setting A, a normal input (pen input) which is not an eraser is set when the contact sensor 520*a* detects contact by the user.

In setting B, selected erasure which erases a contact path is set when the contact sensor 520*b* detects contact by the user.

In setting C, normal erasure (erasure according to a preset erasure width) which erases a passage path is set when the contact sensor 520*c* detects contact by the user.

In setting D, blurred erasure that results in thinning according to the passage frequency is set when the contact sensor 520*d* detects contact by the user.

In Example 3, a high position accuracy is required to selectively erase a contact path. Therefore, this is set to the position of the contact sensor 520*b*, which is the next closest holding position to the pen tip following the normal pen, which is set to the contact sensor 520*a*. Furthermore, erasure of an approximate passed area is set to the position of the contact sensor 520*c*, which is the next closest holding position to the pen tip following the positions of the contact sensors 520*a* and 520*b*.

Furthermore, black filling refers to a process that performs relatively thick filling of a character string or the like, and the position accuracy is lower than that of the positions of the contact sensors 520*a*, 520*b* and 520*c*. Therefore, this is set to the position of the contact sensor 520*d*, which is the next closest holding position following the positions of the contact sensors 520*a*, 520*b* and 520*c*.

Furthermore, blurred erasure does not require position accuracy. Therefore, this is set to the position of the contact sensor 520*e*, which is the furthest from the pen tip.

Example 4

In Example 4, the "pen type" is set using the contact sensor 520.

FIG. 35 is a table showing the settings in Example 4 for performing a pen type setting in the pen-type input device according to the fifth embodiment.

As shown in FIG. 35, in Example 4, the pen type setting has the four settings A, B, C and D. The respective settings correspond to the contact sensors 520a, 520b, 520c and 520d, thereby setting the pen type.

In setting A, a firm brush pen input is set when the contact sensor 520a detects contact by the user.

In setting B, a normal pen input is set when the contact sensor 520b detects contact by the user.

In setting C, an input to highlight with a marker is set when the contact sensor 520c detects contact by the user.

In setting D, brush processing input is set when the contact sensor 520d detects contact by the user.

Example 5

In Example 5, the "line type" is set using the contact sensor 520.

FIG. 36 is a table showing the settings in Example 5 for performing a line type setting in the pen-type input device according to the fifth embodiment.

As shown in FIG. 36, in Example 5, the line type setting has the four settings A, B, C and D. The respective settings correspond to the contact sensors 520a, 520b, 520c and 520d, thereby setting the line type.

In setting A, a normal line input is set when the contact sensor 520a detects contact by the user.

In setting B, a broken line input is set when the contact sensor 520b detects contact by the user.

In setting C, a double line input is set when the contact sensor 520c detects contact by the user.

In setting D, a wavy line input is set when the contact sensor 520d detects contact by the user.

In the line type setting, a double line becomes thick, and a broken line becomes even thicker. Therefore, in Example 5, because a higher position accuracy is required for a normal line and a broken line, these are set to the contact sensors 520a and 520b closest to the pen tip.

Example 6

In Example 6, a "graphic input" is set using the contact sensor 520.

FIG. 37 is a table showing the settings in Example 6 for performing a graphic input setting in the pen-type input device according to the fifth embodiment.

As shown in FIG. 37, in Example 6, the graphic input setting has the five settings A, B, C, D and E. The respective settings correspond to the contact sensors 520a, 520b, 520c, 520d and 520e, thereby setting the graphic input.

In setting A, drawing using a normal pen set when the contact sensor 520a detects contact by the user.

In setting B, drawing using a straight line is set when the contact sensor 520b detects contact by the user.

In setting C, drawing using a triangle image (graphic) is set when the contact sensor 520c detects contact by the user.

In setting D, drawing using a square image (graphic) is set when the contact sensor 520d detects contact by the user.

In setting E, drawing using a circular image is set when the contact sensor 520e detects contact by the user.

In the graphic input setting, a higher position accuracy is required when the number of vertices is reduced. Therefore, in the sixth embodiment, the contact sensor 520c closer to the pen tip is used to set a triangular image (graphic), and the contact sensor 520d which is further away is used to set a square image (graphic).

Example 7

In Example 7, the "editing" function is set using the contact sensor 520.

FIG. 38 is a table showing the settings in Example 7 for performing an edit setting in the pen-type input device according to the fifth embodiment.

As shown in FIG. 38, in Example 7, the editing setting has the four settings A, B, C and D. The respective settings correspond to the contact sensors 520a, 520b, 520c and 520d, thereby setting the editing function.

In setting A, an editing function using a normal pen is set when the contact sensor 520a detects contact by the user.

In setting B, a function that performs swipe processing such as page feeding, scrolling, or the like, is set when the contact sensor 520b detects contact by the user.

In setting C, a saving function of a file or the like is set when the contact sensor 520c detects contact by the user.

In setting D, a create new function of a file or the like is set when the contact sensor 520d detects contact by the user.

In the Example 7, the functions of the contact sensor 520 are set such that, for those functions which are not related to the position accuracy, the frequently used functions are at a holding position close to the normal input.

Example 8

In Example 8, the "pen input mode" is set using the contact sensor 520.

FIG. 39 is a table showing the settings in Example 8 for performing a pen input mode setting in the pen-type input device according to the fifth embodiment.

As shown in FIG. 39, in Example 8, the pen input mode setting has the four settings A, B, C and D. The respective settings correspond to the contact sensors 520a, 520b, 520c and 520d, thereby setting the pen input mode.

In setting A, a normal input mode for performing input using a normal pen is set when the contact sensor 520a detects contact by the user.

In setting B, an eraser mode that erases a drawing is set when the contact sensor 520b detects contact by the user.

In setting C, a mode that selects a tool is set when the contact sensor 520c detects contact by the user.

In setting D, a menu display mode that displays a menu is set when the contact sensor 520d detects contact by the user.

As a result of the above configuration, according to the fifth embodiment, a plurality of contact sensors 520 are consecutively arranged on the pen-type input device 501 along the longitudinal direction of the pen body 510, and the functions can be set according to the holding position of the holding hand of the user P by setting a specific function to the contact sensor 520.

Sixth Embodiment

Next, a sixth embodiment will be described with reference to the drawings.

Figure 40:
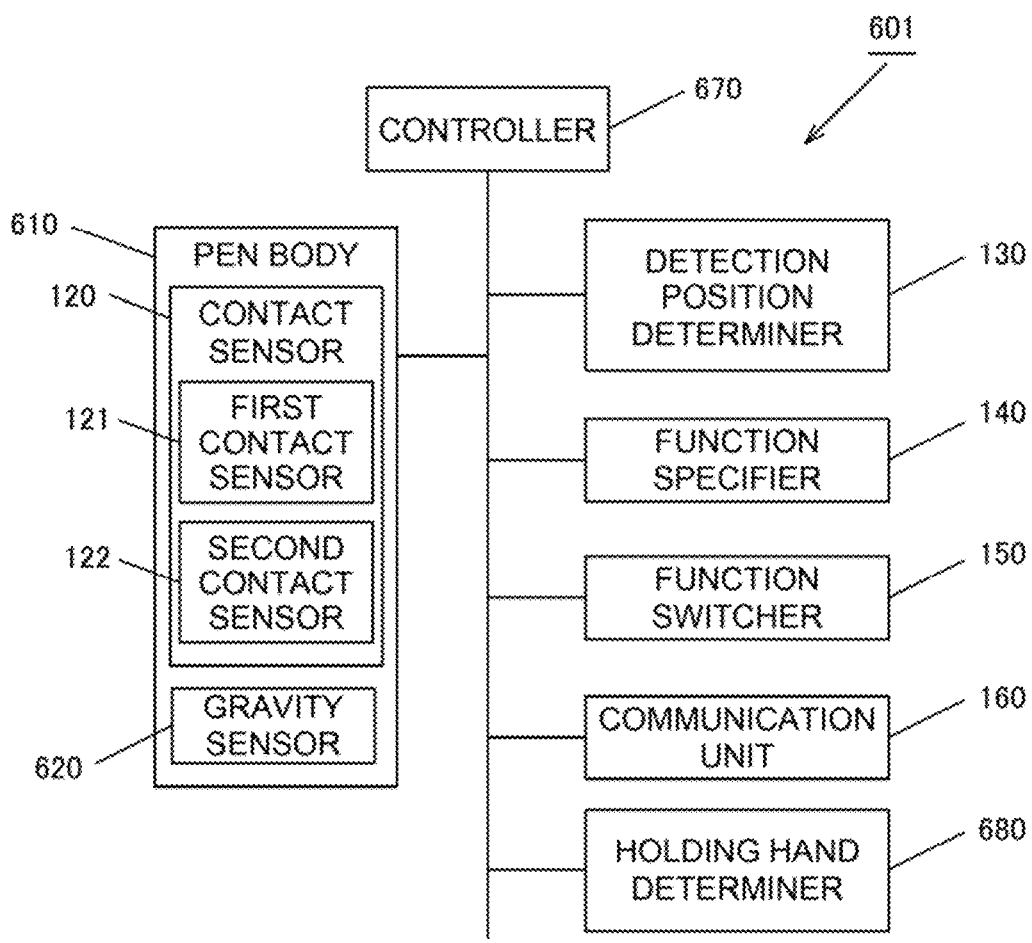
FIG. 40 is a block diagram showing a configuration of a pen-type input device according to a sixth embodiment.

FIG. 40 is a block diagram showing a configuration of a pen-type input device according to a sixth embodiment. FIG.

Figure 42:
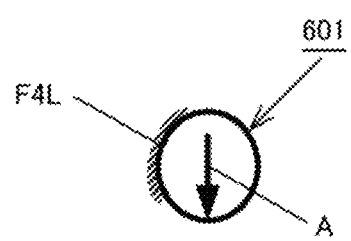
FIG. 42 is an explanatory diagram showing the direction of gravity detected by a gravity sensor when the pen body is held in the left hand.
Figure 43:
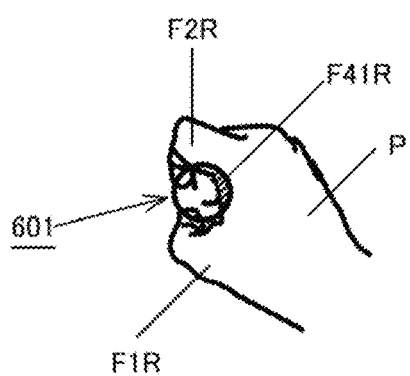
FIG. 43 is an explanatory diagram showing an example of a detection position of a contact sensor when the pen body is held in the right hand.
Figure 44:
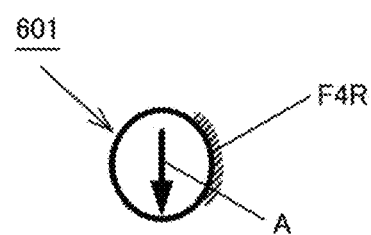
FIG. 44 is an explanatory diagram showing the direction of gravity detected by the gravity sensor when the pen body is held in the right hand.
Figure 45:
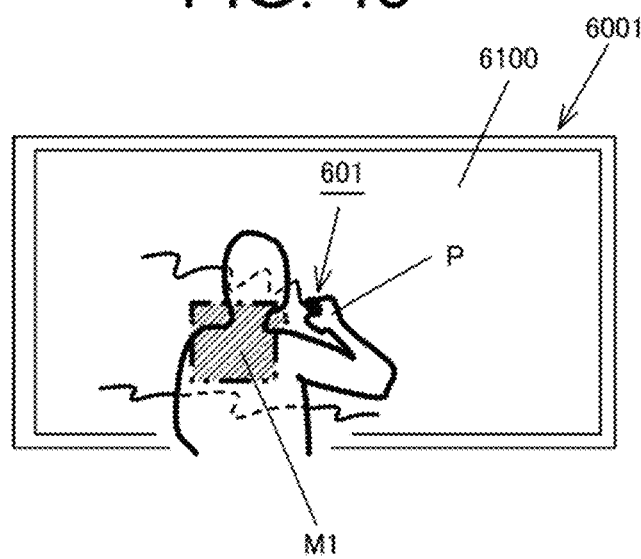
FIG. 45 is an explanatory diagram showing the positional relationship between a user and a menu screen when a menu screen is displayed on the display screen of the display device.

41 is an explanatory diagram showing an example of a detection position of a contact sensor when the pen body of the pen-type input device is held in the left hand. FIG. 42 is an explanatory diagram showing the direction of gravity detected by a gravity sensor when the pen body is held in the left hand. FIG. 43 is an explanatory diagram showing an example of a detection position of a contact sensor when the pen body is held in the right hand. FIG. 44 is an explanatory diagram showing the direction of gravity detected by a gravity sensor when the pen body is held in the right hand. FIG. 45 is an explanatory diagram showing the positional relationship between a user and a menu screen when a menu screen is displayed on the display screen of the display device.

In addition, for convenience of description, the same reference numerals are given to those configurations having the same functions as in the first embodiment, and the description will be omitted.

As shown in FIG. 40, the pen-type input device 601 according to the sixth embodiment includes, in addition to the configuration of the pen-type input device 1, a gravity sensor 620, and a holding hand determiner 680 that determines the holding hand which is holding the pen body 610 based on a detection result from the gravity sensor 620.

Configuration of Pen-Type Input Device

The pen-type input device 601 is primarily configured by a pen body 610, a contact sensor 120, a detection position determiner 130, a function specifier 140, a function switcher 150, a communication unit 160, and a controller 670, and further includes a gravity sensor 620 and a holding hand determiner 680.

The pen body 610 is provided with a gravity sensor 620.

The holding hand determiner 680 determines whether the holding hand of the user P is the left hand or the right hand from the relationship between orientation of the downward direction detected by the gravity sensor 620 and the contact position detected by the contact sensor 120 between the base of the thumb F1 and the base of the forefinger F2 of the holding hand.

Figure 41:
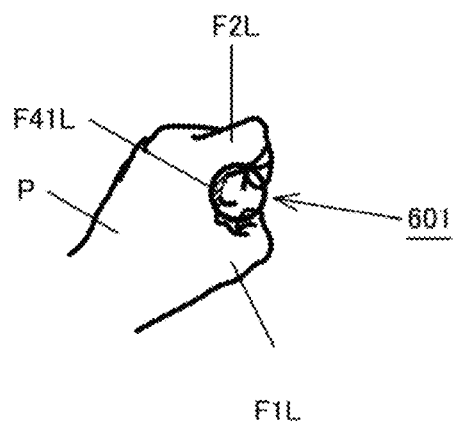
FIG. 41 is an explanatory diagram showing an example of a detection position of a contact sensor when the pen body of the pen-type input device is held in the left hand.

As shown in FIG. 41, when the user P is holding the pen-type input device 601 in the left hand, the contact position F41L between the base of the thumb F1L and the base of the forefinger F2L of the left hand is detected by the contact sensor 120. Then, as shown in FIG. 42, when the gravity sensor 620 detects that the gravity acting on the pen-type input device 601 is in the direction of arrow A, the holding hand determiner 680 determines that the holding hand is the left hand because the portion F4L between the base of the thumb F1L and the base of the forefinger F2L of the holding hand has been detected on the left side of the contact sensor 120.

On the other hand, as shown in FIG. 43, when the user P is holding the pen-type input device 601 in the right hand, the contact position F41R between the base of the thumb F1 and the base of the forefinger F2 of the holding hand is detected by the contact sensor 120. Then, as shown in FIG. 44, when the gravity sensor 620 detects that the gravity acting on the pen-type input device 601 is in the direction of arrow A, the holding hand determiner 680 determines that the holding hand is the right hand because the portion F4R between the base of the thumb F1R and the base of the forefinger F2R of the holding hand has been detected on the right side of the contact sensor 120.

In this manner, it can be determined based on the detection results of the gravity sensor 620 and the contact sensor 120 whether the holding hand with which the user P is holding the pen-type input device 601 is the left or right hand.

Display of Menu Screen of Pen-Type Input Device According to Holding Hand

In the sixth embodiment, it can be determined with certainty whether the holding hand with which the user P is holding the pen-type input device 601 is the right hand or the left hand. Therefore, it is possible to display a menu screen relating to the input operation in a position which is easily viewed by the user P according to the holding hand of the pen-type input device 601.

For example, as shown in FIG. 45, if the user P is holding the pen-type input device 601 in the right hand, a menu screen M1 is displayed on a display screen 6100 of a display device 6001 on the left side of the pen-type input device 601 held by the user P, as shown in the drawing.

Here, an example of a procedure for displaying the menu screen M1 on the display screen 6100 of the display device 6001 using the pen-type input device 601 according to the sixth embodiment will be described with reference to a flowchart.

Figure 46:
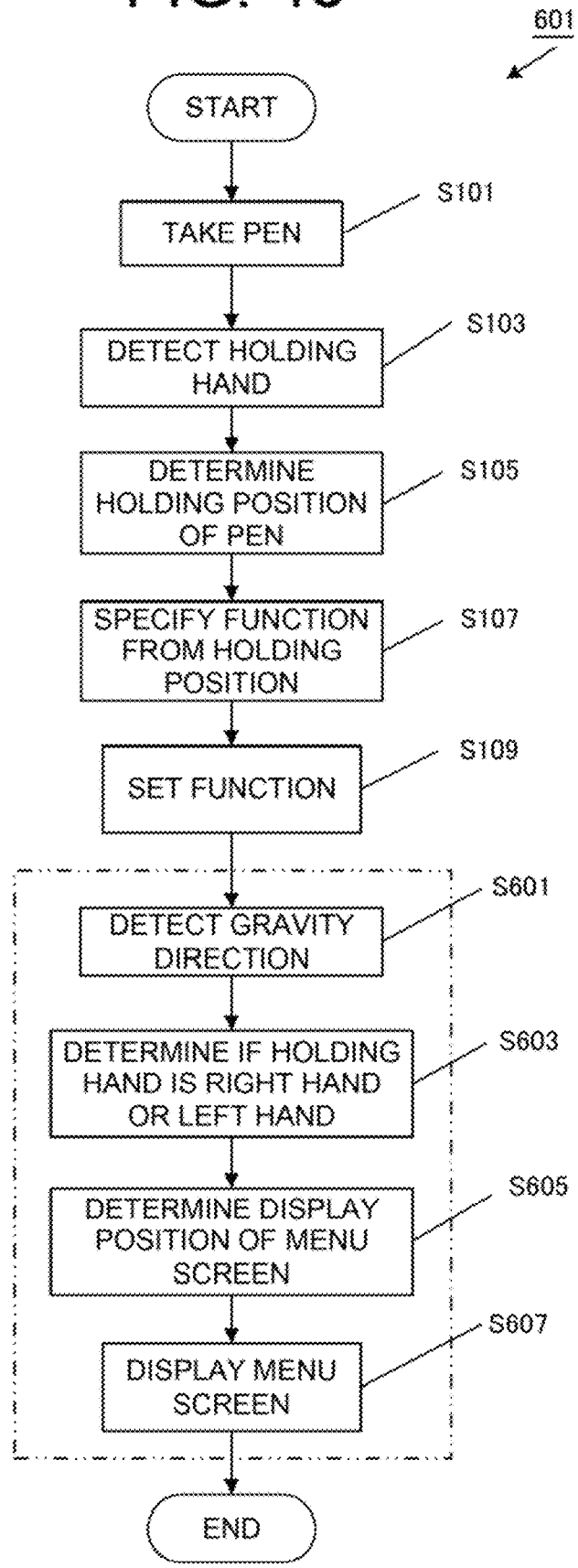
FIG. 46 is a flowchart showing a sequence of processing by which the pen-type input device according to the sixth embodiment displays a menu screen on the display screen.

FIG. 46 is a flowchart showing a sequence of processing by which the pen-type input device according to the sixth embodiment displays a menu screen on the display screen.

As shown in FIG. 46, when an input operation is performed with respect to the display device 6001 using the pen-type input device 601, the user P firstly takes the pen-type input device 601 in a hand, and holds it in a state ready for use (S101). Thereafter, the process of setting the function according to the holding position of the pen-type input device 601 is performed in the same manner as in the first embodiment. Therefore, the description up to S109 is omitted.

After S109, the direction of gravity is detected by the gravity sensor 620 (S601).

Then, based on the detection result from the gravity sensor 620 and the detection result from the contact sensor 120, the holding hand determiner 680 determines whether the user P is holding the pen-type input device 601 using the left or right hand as the holding hand (S603).

Further, based on the determination result from the holding hand determiner 680, the controller 670 determines that the area to display the menu screen M1 on the display screen 6100 of the display device 6001 is the display area on the opposite side to the holding hand which is holding the pen-type input device 601 (S605).

Then, the menu screen M1 is displayed on the specified area of the display screen 6100 of the display device 6001 (S607).

In this manner, the menu screen M1 is displayed on a suitable area of the display screen 6100 of the display device 6001 according to the holding hand which is holding the pen-type input device 1.

As shown in FIG. 45, in the sixth embodiment, the holding hand in which the pen-type input device 601 is held by the user is the right side. As a result, the left side of the pen-type input device 601 is an area of the display screen 6100 which is hidden and not visible due to the user P. Therefore, the browsing of the display screen 6100 by people other than the user P is not interfered with, and further, the menu screen M1 can be displayed in a position which is easily viewed by the user.

As a result of the above configuration, according to the sixth embodiment, the pen-type input device 601 includes a gravity sensor 620 and a holding hand determiner 680. Therefore, based on the detection result from the contact sensor 120 and the detection result from the gravity sensor 620, it can be accurately determined whether the holding hand with which the user P is holding the pen-type input device 601 is the right hand or the left hand.

Seventh Embodiment

Next, a seventh embodiment will be described with reference to the drawings.

Figure 47:
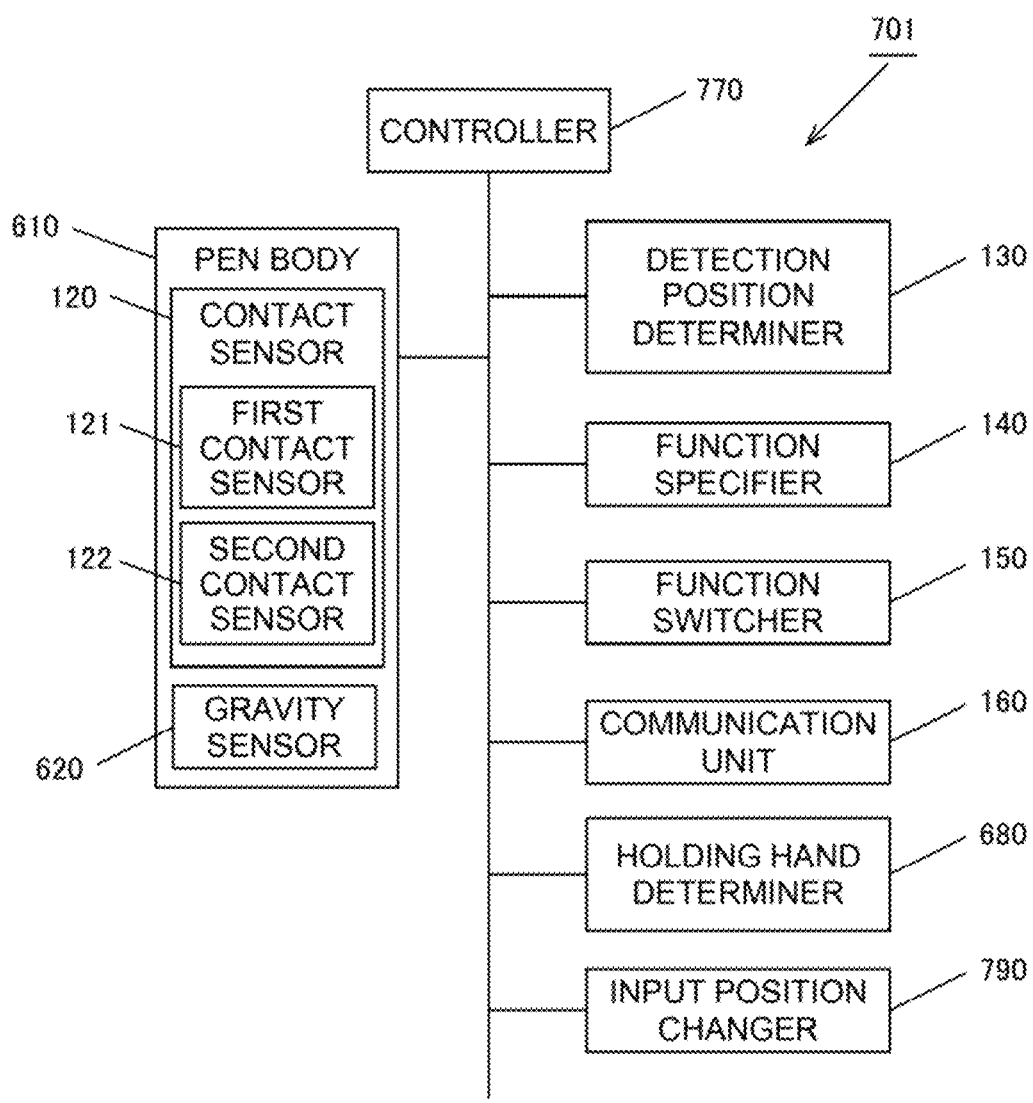
FIG. 47 is a block diagram showing a configuration of a pen-type input device according to a seventh embodiment.
Figure 48:
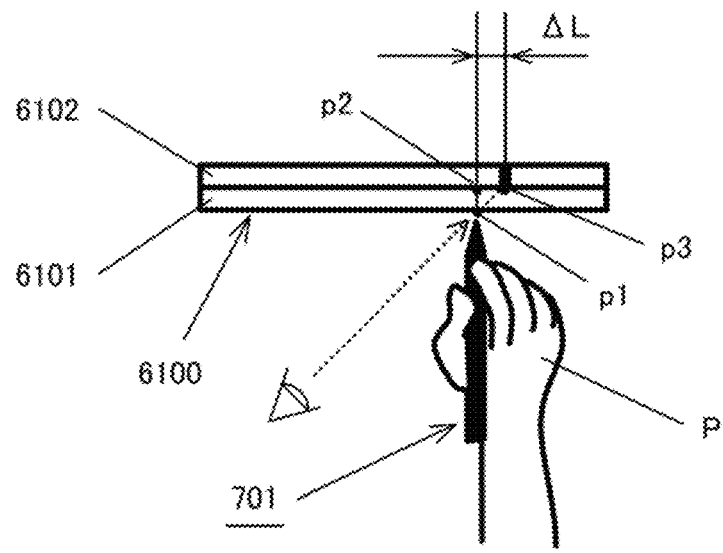
FIG. 48 is an explanatory diagram showing a state in which a path input position has been corrected and shifted by the pen-type input device.
Figure 49:
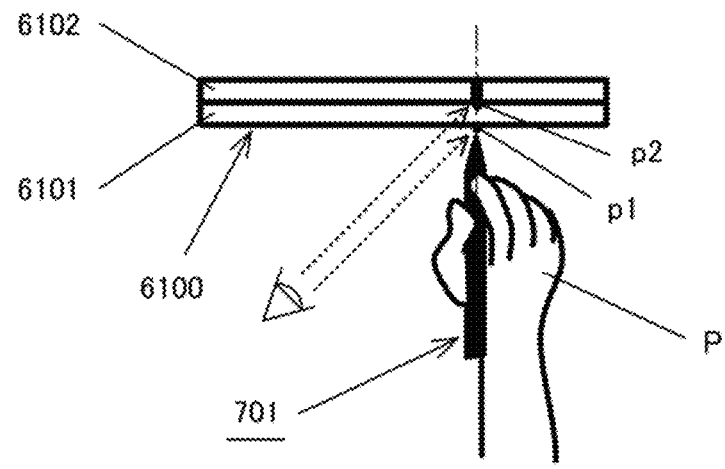
FIG. 49 is an explanatory diagram showing the positional relationship between a pen tip position and a path input position during a normal input to a display screen by the pen-type input device.

FIG. 47 is a block diagram showing a configuration of a pen-type input device according to a seventh embodiment. FIG. 48 is an explanatory diagram showing a state in which a path input position has been shifted by the pen-type input device. FIG. 49 is an explanatory diagram showing the positional relationship between a pen tip position and a path input position during a conventional input to a display screen by the pen-type input device.

In addition, for convenience of description, the same reference numerals are given to those configurations having the same functions as in the fourth embodiment, and the description will be omitted.

As shown in FIG. 47, the pen-type input device 701 according to the seventh embodiment includes, in addition to the configuration of the pen-type input device 601, an input position changer 790 that shifts a path input position of a drawing input by the pen-type input device 701 based on a determination result that determines whether the holding hand with which the user P is holding the pen-type input device 701 is the right hand or the left hand.

Configuration of Pen-Type Input Device

The pen-type input device 701 is primarily configured by a pen body 610, a contact sensor 120, a detection position determiner 130, a function specifier 140, a function switcher 150, a communication unit 160, a gravity sensor 620, a holding hand determiner 680, and a controller 770, and further includes an input position changer 790.

The input position changer 790 shifts the path input position based on a determination result from the holding hand determiner 680 such that the position of the pen tip, which the user P uses to perform an input operation, and the path input position, in which the drawing is input by the pen-type input device 701, coincide on the line of sight observed by the user P.

As shown in FIG. 48, the display screen 6100 of the display device 6001 includes an operation input 6101 positioned on the front surface, and a display 6102 stackingly arranged below the operation input 6101.

As shown in FIG. 49, when the user P uses the pen-type input device 701 to perform an operation that inputs a drawing on the display screen 6100, the position p1 on the operation input 6101 that opposes the pen tip of the pen-type input device 701, and a first path input position p2 displayed on the display 6102 are configured to coincide in plan view. Consequently, parallax occurs when the user P views the device from a diagonal position due to the thickness of the operation input 6101. Therefore, an offset occurs on the line of sight of the user P.

As shown in FIG. 48, according to the pen-type input device 701 of the seventh embodiment, a second path input position p3, which is a position which is shifted by ΔL from the first path input position p2 on the display 6102 that opposes the position p1 of the pen tip, is set such that the position p1 at which the user P performs an input operation, and the second path input position p3, in which the drawing is input by the pen-type input device 701, coincide on the line of sight observed by the user P.

Specifically, based on the determination result from the holding hand determiner 680, the input position changer 790 sets the second path input position p3 to be shifted by ΔL on the holding hand side (the right side for the right hand, or the left side for the left hand) in which the user P is holding the pen-type input device 701.

In this manner, as a result of the input position changer 790 setting the second path input position p3 of the drawing input by the pen-type input device 701, the parallax that occurs when the user P views the device from a diagonal position can be suppressed.

As a result of the above configuration, according to the seventh embodiment, with respect to the pen-type input device 701, the input position changer 790 sets the second path input position p3 the holding hand side of the user such that the position p1, which opposes the pen tip of the pen-type input device 701 on the operation input 6101, and the second path input position p3, in which the drawing is input by the pen-type input device 701, coincide on the line of sight observed by the user P. Therefore, the parallax that occurs due to the thickness of the operation input 6101 is suppressed, the visibility is improved, and an improvement in operability can be achieved.

As described above, the present invention is not limited to the embodiments above, and various changes may be made within the scope of the claims. It is clear that those skilled in the art may arrive at various modifications or corrections within the scope described in the claims. That is to say, embodiments obtained by combining technical means appropriately changed without departing from the scope of the present invention are also included in the technical scope of the present invention.

BRIEF DESCRIPTION OF THE REFERENCE SYMBOLS 1, 201, 301, 401, 501, 601, 701 Pen-type input device
110, 210, 310, 410, 510, 610 Pen body
120, 220, 320, 420, 520 Contact sensor
121, 221 First contact sensor
122, 222 Second contact sensor
130, 230, 330, 430, 530 Detection position determiner
140, 240, 340, 440, 540 Function specifier
150 Function switcher
170, 270, 470, 570, 670, 770 Controller
213, 313 Display
223, 323 Detector
620 Gravity sensor
680 Holding hand determiner
790 Input position changer
6001 Display device
6100 Display screen
6101 Operation input
6102 Display
F1, F1L, F1R Thumb
F2, F2L, F2R Forefinger
F3 Middle finger
F11, F21, F31 Holding position
F41, F41L, F41R Contact position
L1 Thin line
L2 Thick line
M1 Menu screen

What is claimed is:

1. A pen-type input device having a plurality of functions for use with an information processing device capable of receiving an input operation by a touch operation on a display screen, the pen-type input device comprising:

a pen body having a pillar shape;

a contact sensor provided on a portion of a surface of the pen body;

a detection position determiner that determines a holding position of the pen body based on a detection result of the contact sensor; and a function specifier that specifies a function of the pen-type input device based on a determination result of the detection position determiner, wherein the contact sensor detects, on a surface of the pen body, a position where a finger of a holding hand that holds the pen body contacts, and a position where a portion between a base of a thumb and a base of a forefinger of the holding hand contacts, and wherein the function specifier specifies the function based on a rotation angle of the pen body.

2. The pen-type input device according to claim 1, wherein the contact sensor is provided in a plurality of at least two positions in a longitudinal direction of the pen body.

3. The pen-type input device according to claim 1, wherein the detection position determiner determines, based on a detection result of the contact sensor, a holding position of a holding hand that holds the pen body along a longitudinal direction of the pen body.

4. The pen-type input device according to claim 1, wherein the pen body includes a display that specifies, at a specific position on a surface of the pen body that corresponds to a specific detection position of the contact sensor, a specific function that corresponds to the detection position.

5. The pen-type input device according to claim 1, wherein a function specified by the function specifier includes an input mode setting.

6. The pen-type input device according to claim 5, wherein the input mode setting includes at least one of setting a line thickness by a pen input, setting an eraser function, setting an input state by a pen input, setting a line format by a pen input, setting a graphical input, setting an edit function, and setting a color of a pen input.

7. The pen-type input device according to claim 1, wherein the pen body further includes a gravity sensor; and a holding hand determiner that determines, based on a detection result by the gravity sensor, a holding hand that holds the pen body.

8. The pen-type input device according to claim 7, further including a controller that controls operation processing of each part of the pen-type input device, wherein the controller displays, on a display screen of the information processing device, an option menu in a display area on an opposite side to the holding hand that holds the pen body, with respect to an information processing device applied with the pen-type input device, based on a determination result from the holding hand determiner.

9. The pen-type input device according to claim 7, further including a controller that controls operation processing of each part of the pen-type input device, wherein the controller includes an input position changer that shifts a path input position of a drawing input by the pen-type input device, with respect to an information processing device applied with the pen-type input device, based on a determination result of the holding hand determiner.

10. An input control method of a pen-type input device having a plurality of functions for use with an information processing device capable of receiving an input operation by a touch operation on a display screen, the input control method comprising:

detecting that a pen body of the pen-type input device has been held, the pen body having a pillar shape;

determining a holding position of the pen body based on a result of the detecting; and specifying a function of the pen-type input device based on a result of the determining, wherein, in the detecting, a position where a finger of a holding hand that holds the pen body contacts, and a position where a portion between a base of a thumb and a base of a forefinger of the holding hand contacts are detected, and wherein, in the specifying, the function of the pen-type input device is specified based on a rotation angle of the pen body.

11. A non-transitory computer-readable recording medium storing a program of a pen-type input device having a plurality of functions for use with an information processing device capable of receiving an input operation by a touch operation on a display screen, the program causing a computer to implement functions of:

detecting that a pen body of the pen-type input device has been held, the pen body having a pillar shape;

determining a holding position of the pen body based on a result of the detecting; and specifying a function of the pen-type input device based on a result of the determining wherein, in the detecting, a position where a finger of a holding hand that holds the pen body contacts, and a position where a portion between a base of a thumb and a base of a forefinger of the holding hand contacts, and wherein, in the specifying, the function of the pen-type input device is specified based on a rotation angle of the pen body.

12. An information processing system comprising:

an information processing device capable of receiving input operation by a touch operation on a display screen, and a pen-type input device that performs an input operation with respect to the information processing device, wherein the pen-type input device is the pen-type input device according to claim 1.

* * * * *